(12) United States Patent
Ghalebsaz Jeddi

(10) Patent No.: US 8,207,867 B2
(45) Date of Patent: Jun. 26, 2012

(54) METHOD AND DEVICE FOR LANDING AIRCRAFT DEPENDENT ON RUNWAY OCCUPANCY TIME

(75) Inventor: Babak Ghalebsaz Jeddi, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 510 days.

(21) Appl. No.: 12/496,019

(22) Filed: Jul. 1, 2009

(65) Prior Publication Data
US 2010/0001882 A1    Jan. 7, 2010

Related U.S. Application Data

(60) Provisional application No. 61/077,230, filed on Jul. 1, 2008.

(51) Int. Cl.
*G08B 21/00* (2006.01)
(52) U.S. Cl. .............. 340/961; 340/945; 701/120
(58) Field of Classification Search .......... 340/945, 340/961, 963; 701/120–122
See application file for complete search history.

(56) References Cited

U.S. PATENT DOCUMENTS
2010/0063716 A1* 3/2010 Brozat .................. 701/120
* cited by examiner

*Primary Examiner* — Jeffery Hofsass
(74) *Attorney, Agent, or Firm* — David Grossman; David Yee

(57) ABSTRACT

A technique for landing aircraft using an aircraft landing accident avoidance device is disclosed. The technique includes determining at least two probability distribution functions; determining a safe lower limit on a separation between a lead aircraft and a trail aircraft on a glide slope to the runway; determining a maximum sustainable safe attempt-to-land rate on the runway based on the safe lower limit and the probability distribution functions; directing the trail aircraft to enter the glide slope with a target separation from the lead aircraft corresponding to the maximum sustainable safe attempt-to-land rate; while the trail aircraft is in the glide slope, determining an actual separation between the lead aircraft and the trail aircraft; and directing the trail aircraft to execute a go-around maneuver if the actual separation approaches the safe lower limit. Probability distribution functions include runway occupancy time, and landing time interval and/or inter-arrival distance.

20 Claims, 13 Drawing Sheets

METHOD AND DEVICE FOR LANDING AIRCRAFT DEPENDENT ON RUNWAY OCCUPANCY TIME

CROSS REFERENCE TO RELATED APPLICATIONS

This application claims the benefit of U.S. Provisional Patent Application No. 61/077,230, filed Jul. 1, 2008, which is herein incorporated by reference.

STATEMENT REGARDING FEDERALLY FUNDED RESEARCH

This invention was made in part with government support under Grant Numbers NASA Grant 200932, 200833, Nas1-02117, and NSF 200621 awarded by the National Aeronautics and Space Administration. The Government may have certain rights in the invention.

DETAILED DESCRIPTION OF THE EMBODIMENTS

The following notations for input parameters may be used throughout the present application.

$LTI_{k,k+1}$ refers to landing time interval between aircraft k and k+1 measured at the runway threshold in seconds and assumed to have the lower limit L.

$ROT_k$ refers to runway occupancy time of aircraft k measured in seconds.

R refers to dollar benefit of one successful landing.

C refers to expected average cost of a go-around or unsuccessful landing.

$x_0$ refers to minimum wake vortex (WV) safe separation of successive aircraft given in seconds.

DP1 refers to decision point 1; nautical mile (nmi) distance from threshold where pilot/controller decides whether to execute go-around procedure to avoid simultaneous runway occupancy (SRO). This is officially referred to as decision height.

DP2 refers to decision point 2; nmi distance from threshold where pilot/controller decides whether to execute go-around procedure to avoid hazardous wake vortex encounter.

The following notations for decision variables may be used throughout the present application.

$\omega$ refers to landing attempts per hour, i.e., flow rate through the glide slope, and $\omega=3600/\text{mean (LTI)}$ $\lambda$ refers to arrival rate to TRACON or, equivalently, the runway throughput rate, landing per hour.

p refers to probability of go-around P{GA}.

Reference will now be made in detail to several embodiments, examples of which are illustrated in the accompanying drawings. The embodiments relate generally to a method and system for landing aircraft on a runway, and more particularly to determining if there is too large a risk of wake vortex or simultaneous runway occupancy, and executing a go-around maneuver, and otherwise landing the aircraft. Wherever convenient, the same reference numbers will be used throughout the drawings to refer to the same or like parts. Although some of the following embodiments are described in the context of a controller on an aircraft, the disclosed embodiments are not limited to being used as a controller on an aircraft and may be applied to other types of configurations, including, for example, on a distributed system between two aircraft, at a control tower for a runway, etc.

Figure 1:
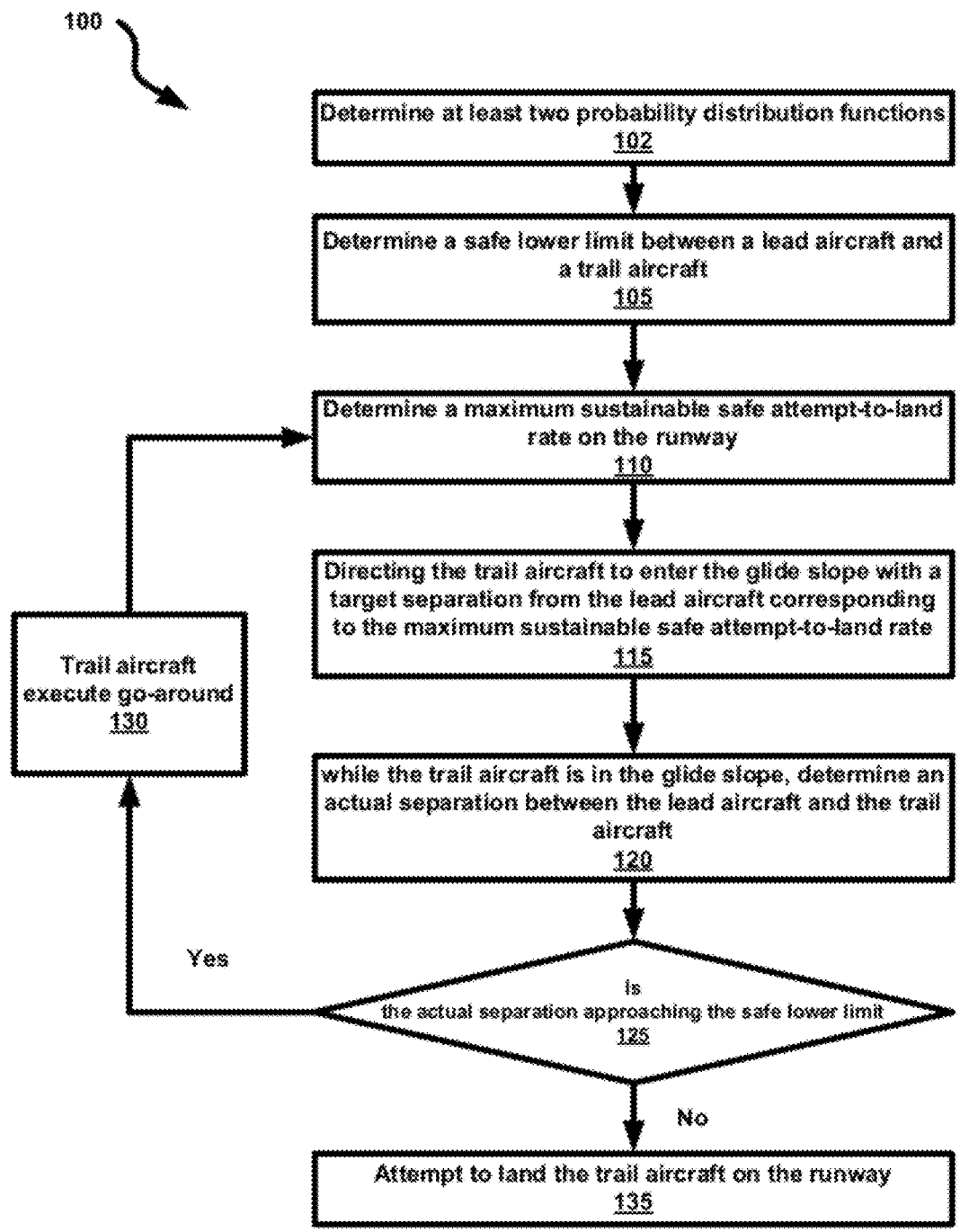
FIG. 1 shows an example of a flow diagram of a method for landing aircraft.
Figure 2:
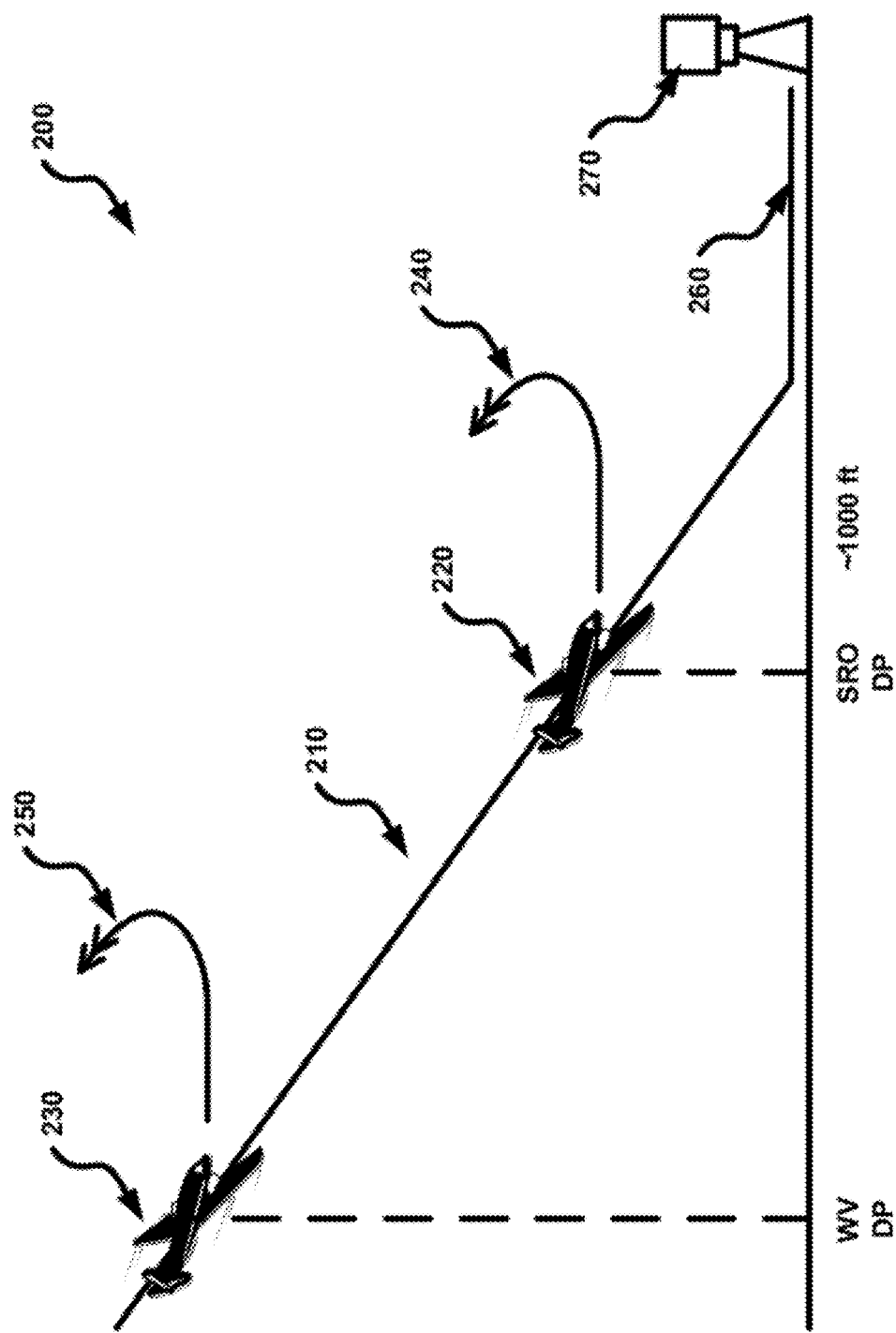
FIG. 2 illustrates an exemplified pictorial diagram of an example approach and landing system.

FIG. 1 shows an example of a method 100 for landing aircraft on a runway 260. Complimenting FIG. 1, FIG. 2 illustrates an exemplified pictorial diagram of an example approach and landing system 200. To perform the method, an aircraft landing accident avoidance device 400 may be used. Generally, the method comprises determining at least two probability distribution functions 102, where one of the probability distribution functions (PDFs) is runway occupancy time (ROT), and where another is (1) landing time interval (LTI); (2) inter-arrival distance (IAD); or (3) a combination thereof; determining a safe lower limit on a separation between a lead aircraft 220 and a trail aircraft (also referred to as follow aircraft) 230 on a glide slope (also sometimes referred to as glide path) to the runway 260, 105; determining a maximum sustainable attempt-to-land-rate on the runway 260 based on the safe lower limit 110; directing the trail aircraft 230 to enter the glide slope with a target separation 425 from the lead aircraft 220 corresponding to the maximum sustainable attempt-to-land-rate 115; while the trail aircraft 230 is in the glide slope, determining an actual separation 436 between the lead aircraft 220 and the trail aircraft 230, 120; and directing the trail aircraft 230 to execute a go-around maneuver 240, 250, 445 if the actual separation 436 approaches or is determined to be approaching the safe lower limit 125, 130. If the actual separation 436 is not approaching or determined to be approaching the safe lower limit, then the trail aircraft 230 is directed to attempt a landing 135.

Multilateration systems have been installed in some airports, such as Detroit Metropolitan Wayne County airport (DTW), to provide reasonably accurate time-position estimates of all transponder-equipped aircraft (a/c) operating in the airport vicinity in all weather conditions. These data can be used to obtain samples of landing process variables, such as LTI between successive aircraft to the runway threshold, IAD between two successive aircraft at the moment that the lead aircraft crosses the runway threshold, and ROT. ROT is the length of time required for an arriving aircraft to proceed from over the runway threshold to a point clear of the runway. The present invention considers LTI, IAD, and ROT as (random) variables.

Lower limit (L) (also sometimes referred to as safe lower limit) is the minimum time for an LTI distribution. L may be based on historical data. LTI is the time it takes between one aircraft landing and another aircraft landing. When multiple aircrafts are landing on a same path (e.g., runway, landing strip, etc.), there needs to be sufficient separation time between two or more aircrafts to allow for safe landings. In essence, as one embodiment of the present invention, a safe lower limit may be determined to be at about 40 seconds. Lead aircraft 220 refers to the aircraft that is landing first. Trail aircraft 230 refers to the aircraft that is to land immediately after the lead aircraft 220. Both aircraft can be any type of aircraft. For example, aircraft may be any jet and/or propeller aircraft, any commercial aircraft (e.g., Delta Airlines, Continental Airlines, American Airlines, British Airways, FedEx, etc.), private aircraft (e.g., MarquisJet, etc.), military aircraft (e.g., B1, C-17, C-130, F-16, F-18, KC-135, etc.) Sizes of the aircraft may also vary from small (e.g., Cessna, Learjet, etc.) to medium (e.g., MD-80/88, Boeing 737-300/400/500 series, Airbus 320 series, etc.), to large (Boeing 757, Boeing 767, Airbus 310 series, etc.) to heavy (e.g., Boeing 747, Boeing 777, Airbus A300, Airbus 380, etc.).

Glide path 210 refers to an approach path (which may be designated) to a runway 260 or other landing surface for the aircraft. Glide path 210 may include the final descent path for aircraft. Aircraft may enter the glide path 210 upon approach or from a holding pattern to an airport. In one embodiment, glide path 210 may include a starting point in three dimensional space, and an ending point in three dimensional space, such as a point on a runway 260 and the path between the starting and ending points. To monitor aircraft into and through a glide path 210, one or more operators from a ground control system 270 (such as a control tower, ground based sensors (e.g., radar, etc.), etc.) may be needed.

Throughout the present invention, runway 260 is defined as a single runway or at least two parallel runways that are at least about 2500 feet apart from each other.

PDFs and the lower limit may be determined in any order. For instance, PDFs may be determined first, followed by the lower limit. Alternatively, the lower limit may be determined first, followed by the lower limit. As another example, both may be determined simultaneously.

Once the PDFs and the lower limit have been determined, a maximum sustainable attempt-to-land-rate can then be determined 110. Based on the safe lower limit, the maximum sustainable attempt-to-land-rate is the target rate at which multiple aircraft is allowed to safely land on the same pathway (i.e., runway, etc.). The units for such target are time-based, such as be per quarter hour, per half hour, per hour, etc.

Figure 3:
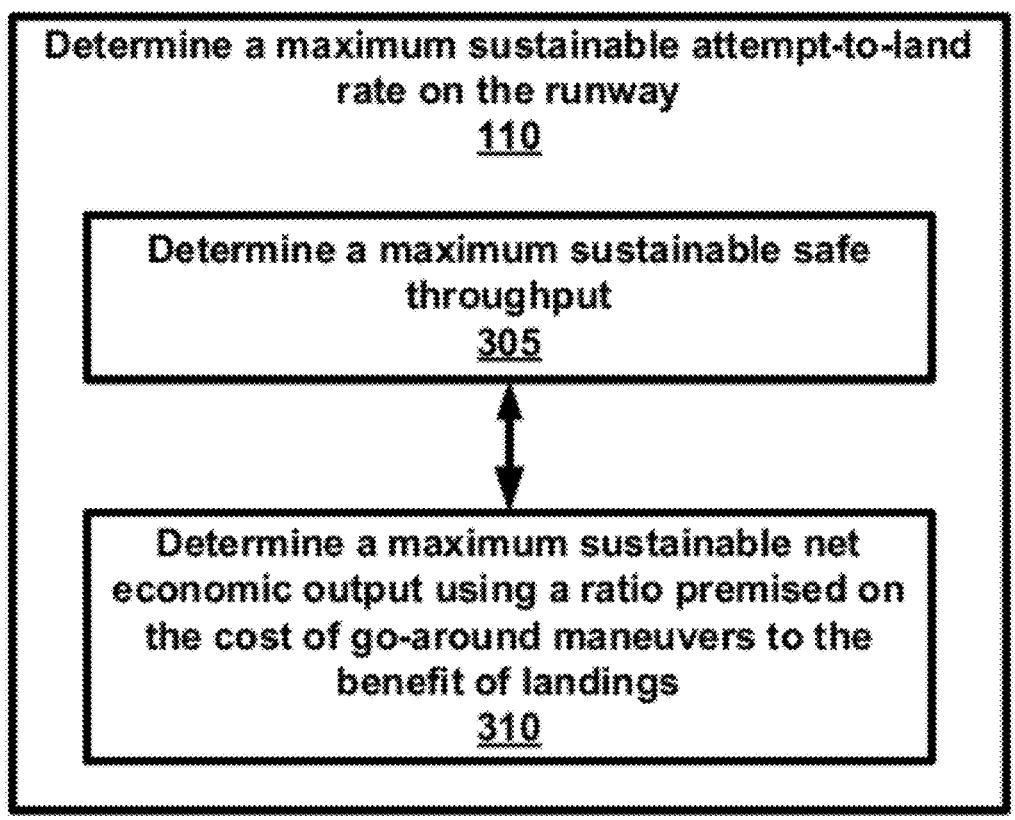
FIG. 3 shows another example of a flow diagram with additional aspects of determining the maximum sustainable attempt-to-land-rate.

As indicated in FIG. 3, the maximum sustainable attempt-to-land-rate includes determining a maximum sustainable safe throughput 305, a maximum sustainable net economic output 310, or a combination of the two. Sustainable means average. As described below, the maximum sustainable safe throughput 305 is determined using a probability of executing the go-around maneuver 240, 250, 445 and the maximum sustainable attempt-to-land-rate. In addition, as described below, the maximum sustainable net economic output 310 (e.g., optimality, profit, benefit, gain, surplus, etc.) is determined using a ratio premised on the cost-benefit ratio of go-around maneuvers 240, 250, 445 to landings.

Go-around maneuvers 240, 250, 445 may be any maneuver by trail aircraft 230 to fly out of the glide path 210. There may be a multitude of reasons why a trail aircraft 230 may execute a go-around maneuver 240, 250, 445. For instance, there may be the wake vortex created by the lead aircraft 220 may be so large and/or long that it endangers the safety of the trail aircraft 230. Another reason may be the trail aircraft 230 may be entering the glide path 210 at too fast of a speed that it will not have sufficient space to land safely and avoid the lead aircraft 220. A further reason may be that one or a flock of birds, which may get sucked into the engine(s), may suddenly enter the glide path 210.

For whatever reason the trail aircraft 230 needs to execute a go-around maneuver 240, 250, 445, the go-around maneuver 240, 250, 445 works in this way: the trail aircraft 230 first leaves the glide path 210. After clearing the danger zone and reentering a safe flight, the trail aircraft 230 may circle around. It may also reenter the same holding pattern or enter a new holding pattern. Whichever holding pattern the trail aircraft 230 has entered, the trail aircraft 230 may then be instructed to reenter the glide path 210 and attempt another landing.

With the lower limit and the maximum sustainable attempt-to-land-rate at hand, the trail aircraft 230 may be directed to enter the glide slope with a target separation 425 from the lead aircraft 220 corresponding to the maximum sustainable attempt-to-land-rate. While the trail aircraft 230 is in the glide slope, the actual separation 436 between the lead aircraft 220 and the trail aircraft 230 needs to be determined. The actual separation 436 is the time that it takes for the trail aircraft 230 to reach a specific coordinate that the lead aircraft 220 once occupied. The specific coordinate can be viewed as a marker. If the actual separation 436 approaches the safe lower limit, the trail aircraft 230 is directed to execute a go-around maneuver 240, 250, 445. "Approaches" means the time (e.g., 1 second, 5 seconds, etc.) it takes to reach the safe lower limit by taking into consideration the pilot's reaction time and the response time of the plane from a mechanical and/or sensor perspective based on the pilot's reaction.

Moreover, the timing of when to direct the trail aircraft 230 to execute a go-around maneuver 240, 250, 445 depends the reaction time of the trail aircraft 230. Reaction time includes the time for the pilot to react, computer response time, time for mechanical parts, instruments, and sensors to respond to the pilot's actions, communication, etc.

As an analogy, the target separation 425 and actual separation 436 can be viewed from the perspective of tailgating. As a rule of thumb, to determine if one is tailgating on a highway, drivers are suggested use a marker on the road (e.g., a tree, bridge, sign, etc.) and count 2 seconds from when the vehicle in front passes the marker and the vehicular driver passes that same marker. If the vehicular driver is under 2 seconds, the vehicular driver is beyond the safe lower limit and target separation with respect to braking distance. Thus, the actual separation (the distance between the vehicular driver and the vehicle in front) is smaller than the target separation. This shorter distance means that the vehicular driver should slow down to increase the distance between the vehicular driver and the vehicle in front.

Along the glide path 210, there may be one or more wake vortex decision points where one or more aircrafts may execute a go-around maneuver 250, 445. As such, the go-around maneuver 250, 445 begins at a wake vortex decision point. If at any time, such an aircraft misses or bypasses one wake vortex decision point, or if such aircrafts fails an attempted go-around maneuver 250, 445 the glide path 210 may have additional wake vortex decision points to allow execution of go-around maneuver 250, 445 or another attempt at a go-around maneuver 240, 445.

The wake vortex decision point may be a set of points on the glide path 210. For example, the range can be within five to twenty nautical miles from the start of runway 260. Each wake vortex decision point may be determined as (1) a distance measured from the beginning point of the runway 260 to a point in the glide path 210, (2) a time measured from runway 260 while being in the glide path 210, (3) a distance and/or time in the glide path 210 between the lead aircraft 220 and the trail aircraft 230, (4) a distance and/or time in the glide path 210 between the trail aircraft 230 and the simultaneous runway occupancy (SRO) decision point (which is also a point or range of points along the glide path 210), or (5) any combination of these. Other embodied factors that may be considered include the difference in velocity between lead aircraft 220 and trail aircraft 230, as well as any expected change in velocity between lead aircraft 220 and trail aircraft 230.

Wake vortex (also generally known as wake turbulence) is turbulence, sometimes in the shape of a vortex, that forms behind an aircraft as it passes through air. Wake vortexes from a lead aircraft 220 may cause the trail aircraft 230 to encounter control difficulties and/or turbulence if trail aircraft 230 is too close to lead aircraft 220. The size and length of the wake vortex created may depend on lead aircraft 220's physical characteristics (such as size, weight, jet and/or propeller, wing-span, etc.), and atmospheric conditions (such as visibility, wind, temperature, weather, humidity, temperature, pressure, etc.).

Similarly, the safe lower limit also depends on the above lead aircraft's 220 physical characteristics and atmospheric conditions. Additionally, the safe lower limit also depends on the trail aircraft's 230 physical characteristics (e.g., size, weight, jet/propeller, wing-span, etc.).

As an additional embodiment, along the glide path 210, there may be a simultaneous runway occupancy (SRO) decision point where the trail aircraft 230 may execute another go-around maneuver 240, 445 (whether it be second attempt, third attempt, etc.). Such go-around 240, 445 may be necessary if a first attempt at the wake vortex decision point is not successful. However, when another attempt is made, the go-around maneuver 240, 445 involves having the trail aircraft 230 leave the glide path 210. The trail aircraft 230 may then circle around and reenter the same or different holding pattern. Once in a holding pattern, the trail aircraft 230 may re-enter the glide path 210 once directed.

As an example, the SRO decision point may be a range of points on the glide path 210, such as within one to ten nautical miles from the start of runway 260. In another example, the SRO decision point may be a specific point on the glide path 210, such as 5.9 nautical miles from the start of runway 260. In yet another example, the SRO decision point may be the beginning point of any aircraft's "final approach." In yet another further example, the SRO decision point may be measured in time from the runway 260, aircraft's distance between the glide path 210 to the runway 260, and/or distance and/or time between the lead aircraft 220 and the trail aircraft 230. Also, as another example, the difference in velocity, as well as any expected change in velocity, between the lead aircraft 220 and the trail aircraft 230 may be considered.

It should be noted that while the above determinations are framed in terms of lead aircraft 220 and trail aircraft 230, they may also be performed for a series of aircraft, where each trail aircraft 230 may be a lead aircraft 220 for the next aircraft to enter glide path 210.

Figure 4:
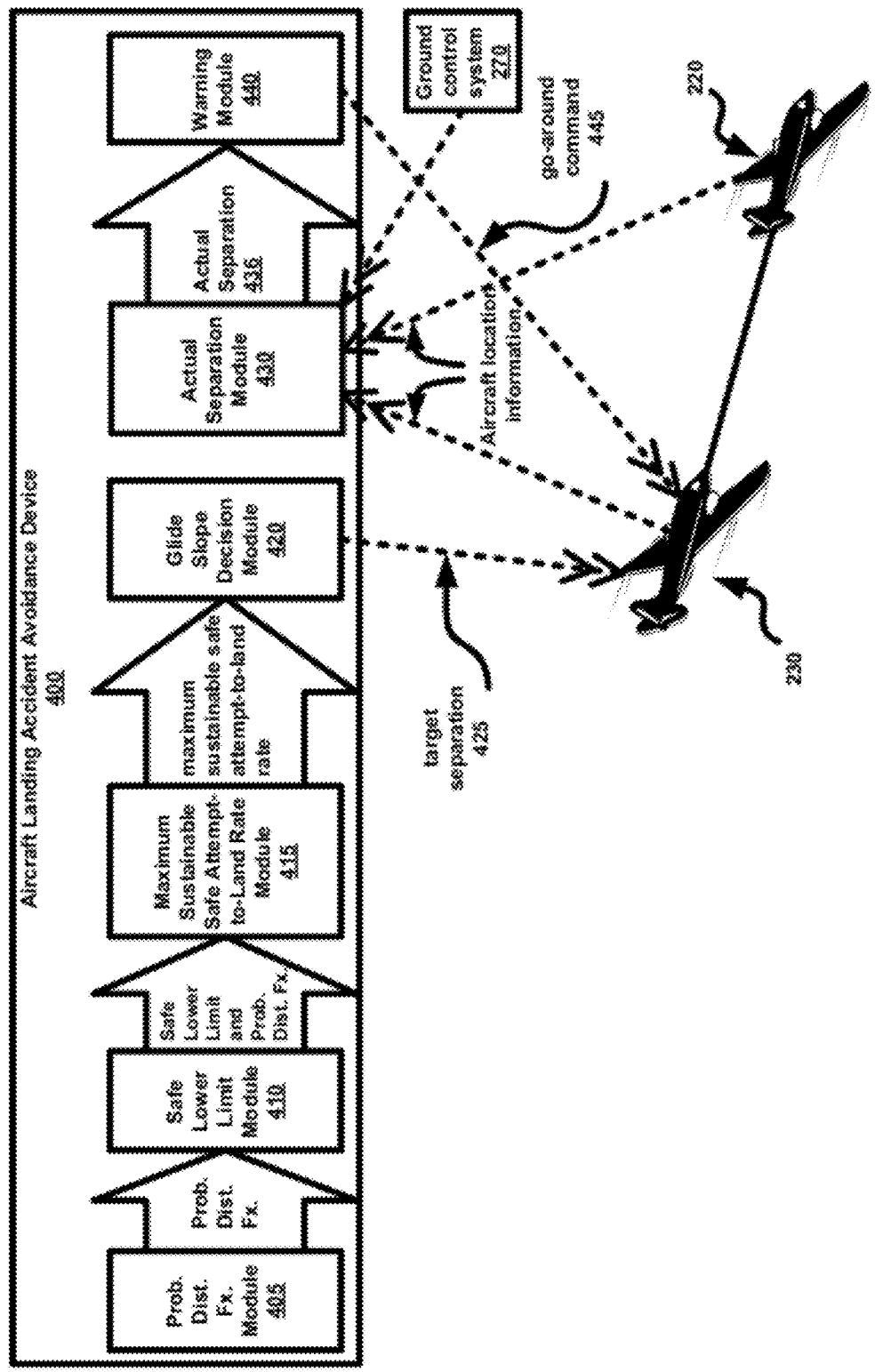
FIG. 4 shows an example of a block diagram of an aircraft landing accident avoidance device.

As the above methods and definitions are implementable by an aircraft landing accident avoidance device 400, reference is now made to such device. FIG. 4 shows the various physical modules that make up, and are integrated within, the aircraft landing accident avoidance device 400. These modules include, but are not limited to, a probability distribution function module 405, a safe lower limit module 410, a maximum sustainable attempt-to-land-rate module 415, a glide slope decision module 420, an actual separation module 430, and a warning module 440.

The probability distribution function module 405 may be configured for determining at least two probability distribution functions, where one of the probability distribution functions is runway occupancy time, and where another is landing time interval; inter-arrival distance; or a combination thereof;

The safe lower limit module 410 may be configured for determining a safe lower limit on a separation between a lead aircraft 220 and a trail aircraft 230 on a glide slope to a runway 260. The safe lower limit may depend on a multitude of factors, such as atmospheric conditions, the physical characteristics of the lead aircraft 220, and the physical characteristics of the trail aircraft 230. Atmospheric conditions may include visibility, wind, temp, weather, etc. Physical characteristics for either the lead aircraft 220 or the trail aircraft 230 include size, weight, jet/propeller, wing-span, etc.

The maximum sustainable attempt-to-land-rate module 415 may be configured for determining a maximum sustainable attempt-to-land-rate (aka target) on the runway 260 based on the safe lower limit. Like above this rate can be per quarter hour, per half hour, per hour, etc.

The maximum sustainable attempt-to-land-rate module 415 may also be configured for determining a target separation 425.

The maximum sustainable attempt-to-land-rate module 415 includes: a maximum sustainable safe throughput module; a maximum sustainable net economic output module; or a combination of the above. Sustainable means average. The maximum sustainable safe throughput module is configured for using a probability of executing the go-around maneuver 240, 250, 445 and the maximum sustainable attempt-to-land-rate. The maximum sustainable net economic output module is configured for using a ratio premised on the cost of go-around maneuvers 240, 250, 445 to the benefit of landings.

The glide slope decision module 420 may be configured for directing the trail aircraft 230 to enter the glide slope with a target separation 425 from the lead aircraft 220 corresponding to the maximum sustainable attempt-to-land-rate.

The actual separation module 430 may be configured for determining an actual separation 436 between the lead aircraft 220 and the trail aircraft 230 while the trail aircraft 230 is in the glide slope.

In certain embodiments, a controller device, which may be an aircraft instrument, may take and use these stored instructions stored in the computer readable storage medium 500 to calculate the target separation 425 and actual separation 436. In other embodiments, a control tower 270 may use these stored instructions to calculate the target separation 425 and the actual separation 436. Both the trail separation and the actual separation 436 may be designated in distance (e.g., nautical miles), time (e.g., seconds, etc.), velocity of each aircraft, etc. Where additional multiple instruments (e.g., radar, etc.) can determine the target separation and/or actual separation distance, such distance may be used to cross check the target separation and/or actual separation distance as determined via the maximum sustainable attempt-to-land-rate module 415 and the actual separation module 430.

The warning module 440 may be configured for directing the trail aircraft 230 to execute a go-around maneuver 240, 250, 445 if the actual separation 436 approaches the safe lower limit at any point in time of an attempted landing. As defined above, "approaches" means the time it takes to reach the safe lower limit by taking into consideration the pilot and plane's reaction time—e.g., 1 sec, 5 secs, etc.). The go-around maneuver 240, 250, 445 begins at a wake vortex decision point.

Additionally, the warning module 440 considers the reaction time of the trail aircraft 230 as to when to direct the trail aircraft 230 to execute a go-around maneuver 240, 250, 445. Reaction time includes, for example, pilot's reaction time, computer response time, mechanical response time, communications, sensors, etc.

It should be noted that while the above determinations are framed in terms of lead aircraft 220 and trail aircraft 230, they may also be performed for a series of aircraft, where each trail aircraft 230 may be a lead aircraft 220 for the next aircraft to enter glide path 210.

Figure 5:
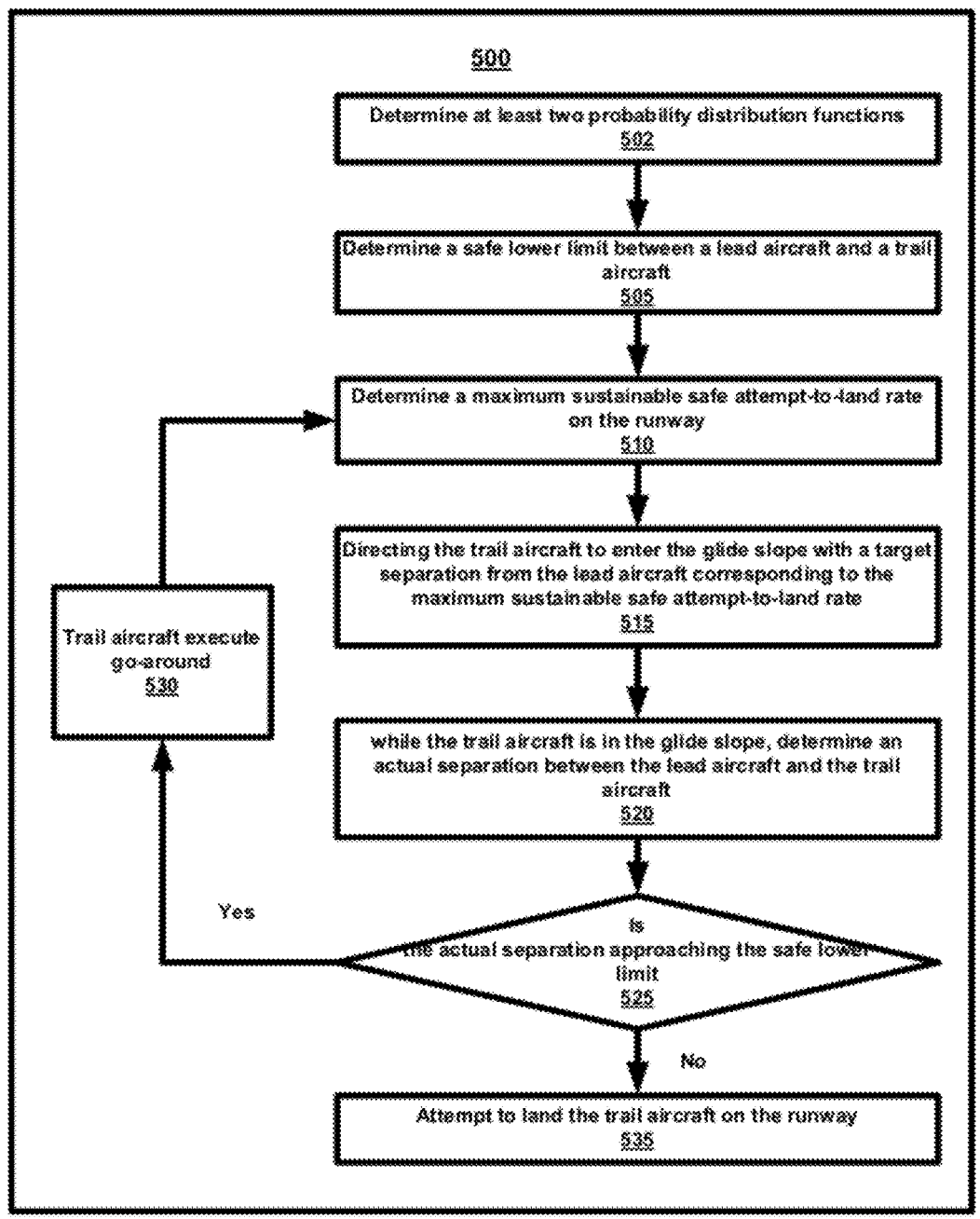
FIG. 5 shows exemplified instructions for landing an aircraft, where the instructions are stored in a computer readable storage medium.

As the above methods (and the definitions which the above methods rely upon) can also be stored in a computer readable storage medium 500, reference is now made to such storage medium. Referring to FIG. 5, the computer readable storage medium 500 may store instructions for performing a method, when executed by a processor or device (such as the aircraft landing accident avoidance device 400), for landing aircraft on a runway 260. The instructions for such method include: determining at least two probability distribution functions 502, where one of the probability distribution functions is runway occupancy time, and where another is: landing time interval; inter-arrival distance; or a combination thereof; determining a safe lower limit on a separation between a lead aircraft 220 and a trail aircraft 230 on a glide slope to the runway 260, 505; determining a maximum sustainable attempt-to-land-rate on the runway 260 based on the safe lower limit 510; directing the trail aircraft 230 to enter the glide slope with a target separation 425 from the lead aircraft 220 corresponding to the maximum sustainable attempt-to-land-rate, 515; while the trail aircraft 230 is in the glide slope, determining an actual separation 436 between the lead aircraft 220 and the trail aircraft 230, 520; and directing the trail aircraft 230 to execute a go-around maneuver 240, 250, 445 if the actual separation 436 approaches the safe lower limit, 525, 530.

Examples of the computer readable storage medium 500 include, but are not limited to, a compact disc (cd), digital versatile disc (dvd), blu ray disc, usb flash drive, floppy disk, random access memory (RAM), read-only memory (ROM), erasable programmable read-only memory (EPROM), optical fiber, electronic notepad or notebook, etc. It should be noted that the computer readable storage medium 500 may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

The instructions may be written using any computer language or format. Nonlimiting examples of computer languages include Ada, Ajax, Basic, C, C++, Cobol, Fortran, Java, Python, XML, etc.

The instructions on the computer readable storage medium 500 may be executed by a specific aircraft controller or some controller at a control tower 270 that is geared to making safe landing determinations and safe (and/or regulated) trailing distances between lead aircraft 220 and trail aircraft 230.

The safe lower limit may depend on a multitude of factors, such as atmospheric conditions, the physical characteristics of the lead aircraft 220, and the physical characteristics of the trail aircraft 230. Atmospheric conditions may include visibility, wind, temp, weather, etc. Physical characteristics for either the lead aircraft 220 or the trail aircraft 230 include size, weight, jet/propeller, wing-span, etc.

Once the lower limit has been determined 505, a maximum sustainable attempt-to-land-rate can then be determined 510. Based on the safe lower limit, the maximum sustainable attempt-to-land-rate is the target rate at which multiple aircraft are allowed to safely land on the same pathway (i.e., runway, etc.). The units for such target are time-based, such as be per quarter hour, per half hour, per hour, etc.

The maximum sustainable attempt-to-land-rate includes determining a maximum sustainable safe throughput, a maximum sustainable safe net economic output, or a combination of the two. Sustainable means average. The maximum sustainable safe throughput is determined using a probability of executing the go-around maneuver 240, 250, 445 and the maximum sustainable attempt-to-land-rate. The maximum sustainable net economic output (e.g., optimality, profit, benefit, gain, surplus, etc.) is determined using a ratio premised on the cost of go-around maneuvers 240, 250, 445 to the benefit of landings.

The computer readable storage medium 500 further includes instructions for directing the trail aircraft 230 to enter the glide slope according to the target separation 425 after the safe lower limit and the maximum sustainable attempt-to-land-rate are determined 515.

After providing such instructions, the computer readable storage medium 500 can provide instructions for determining the actual separation 436 between the lead aircraft 220 and the trail aircraft 230 while the trail aircraft 230 is in the glide slope 520.

In certain embodiments, a controller device, which may be part of the instruments of any aircraft, may take and use these stored instructions stored in the computer readable storage medium 500 to calculate the target separation 425 and actual separation 436. In other embodiments, a control tower 270 may use these stored instructions to calculate the target separation 425 and the actual separation 436. Both the trail separation and the actual separation 436 may be designated in distance (e.g., nautical miles), time (e.g., seconds, etc.), velocity of each aircraft, etc. Where additional multiple instruments (e.g., radar, etc.) can determine the target separation and/or actual separation distance, such distance may be used to cross check the target separation and/or actual separation distance as determined via the instructions housed in the computer readable storage medium 500.

The computer readable storage medium 500 may further house instructions for directing the trail aircraft 230 to execute a go-around maneuver 240, 250, 445 if the actual separation approaches the safe lower limit 525, 530. As defined above, "approaches" means the time it takes to reach the safe lower limit by taking into consideration the pilot and plane's reaction time—e.g., 1 sec, 5 secs, etc.). The go-around maneuver 240, 250, 445 begins at a wake vortex decision point.

The computer readable storage medium 500 may also further house instructions for directing the trail aircraft 230 to attempt a landing if the actual separation does not approach the safe lower limit 535.

Additionally, the computer readable storage medium 500 includes instructions for considering the reaction time of the trail aircraft 230 as to when to direct the trail aircraft 230 to execute a go-around maneuver 240, 250, 445. Reaction time includes, for example, pilot's reaction time, computer response time, mechanical response time, communications, sensors, etc.

It should be noted that while the above determinations are framed in terms of lead aircraft 220 and trail aircraft 230, they may also be performed for a series of aircraft, where each trail aircraft 230 may be a lead aircraft 220 for the next aircraft to enter glide path 210.

The present invention can be applied to any instrumental landing and be independent of meteorological conditions.

Embodiments of Procedures

I. Determining Probability Distribution Functions

To determine PDFs using ROT and LTI, IAD, or LTI and IAD, mulitlateration data (e.g, from an airport, like Detroit Metropolitan Wayne Count airport (DTW)) need to be extracted. Out of a possible eighteen fields from multilateration data, the present invention may consider five: aircraft mode-s, time (t in seconds), longitude (X in meters), latitude (Y in meters), and mode-c. The mode-s field is a number of an attached transponder that uniquely identifies an aircraft. The transponder is generally attached somewhere close to the center of the aircraft. The mode-c field is a barometer-based value that can be converted to altitude (in feet) by multiplying it by 25 and adding 10,000 to the result. However, the obtained value is not very reliable for this purpose due to pressure change and barometer errors under for different weather conditions. Time and position of aircraft are recorded every second.

A. Data Preparation

The database that stores aircraft landing data at an airport may be in Oracle format. SQL+ may be used SQL+ to obtain queries. Necessary manipulations and sample extractions may be done in MATLAB.

To start, the following may be sorted in this order: data by mode-s and then by time. The time stamp may be changed to the format "dd/mm/yyhh:mi:ss." Basic queries demonstrated that the mode-s may be missing for some records. In some cases, the mode-s of an entire aircraft track may be missing. In other cases, the mode-s of only a few points along a track may be missing. Such data points may be eliminated. In the latter case, the basic track path may be retained, since the path of the aircraft from the other points with mode-s can be linearly interpolated. In the former case, the entire track may be discarded. This action may result in some inter-arrival times that are too long. However, because of the available data, losing some possible landing records does not have a significant impact. Using DTW as the exemplified embodiment, the origin (X=0,Y=0) of the Euclidian coordinate may be the FAA control tower located between runways 21R and 22L, and the Y axis indicates the true north. DTW's runway 21L, and all other runways parallel to it, have a Magnetic angle of 214.8°. True North and Magnetic North have an angle of 6.1° W. Thus, the true angle of runway 21L is 214.8−6.1=208.7°, or equivalently 61.3° from the X-axis. Since data may be collected in the true coordinates, the same results may be observed by tracking the aircraft course on the runways. In the same manner, the true angle of runways 27L/09R and 27R/09L may be calculated as 1.3° from the X-axis. To simplify working with the database, the coordinates may be rotated to make the runways parallel to the X-axis. To find the aircraft position in the rotated coordinates, the observed (XY) position may be multiplied by the rotation matrix R as $$R = \begin{pmatrix} \cos(a) & \sin(a) \\ -\sin(a) & \cos(a) \end{pmatrix} \quad (1)$$

where a is the rotation angle which is 61.3° for runways 21L/03R, 21R/03L, 22L/04R and 22R/04L, and 1.3° for runways 27L/09R and 27R/09L as described before. That is, the aircraft position in the rotated Euclidian coordinates is $$\begin{pmatrix} X_r \\ Y_r \end{pmatrix} = R * \begin{pmatrix} X \\ Y \end{pmatrix}. \quad (2)$$

Using the rotation formula (2), the runway coordinates may be transformed to the new coordinates.

Since landings are the subject of study, it is sufficient to consider data in a rectangle, which may be referred to as a "query box." The sides of the query box are parallel to the sides of the runway rectangle, and the box includes the runway and the common landing path extended about 10 nm from the runway threshold. For DTW's runway 21L, for example, the rectangle −1350 m<$X_r$<18500 m, and −3000 m<$Y_r$<−800 m may be considered. Data beyond this rectangle may be dropped from the query. Queries may be obtained for every runway for a certain period of time (e.g., a week) for data sampling. The time stamp of each of these outputs may be transformed to a second-format with respect to a time reference. Time zero may be considered as, for instance, January 1.

Position is recorded at a second rate; however, there may be time gaps when position is not recorded. For such cases, if the gap is at most 10 seconds, the timeposition of the aircraft may be linearly interpolated between two boundaries of the time gap for every second. This interpolation is not applied for time gaps greater than 10 seconds. This procedure may be implemented in MATLAB.

Other factors that need to be considered include wake vortex weight classes, and weather conditions (Instrumental Meteorological Condition (IMC) or Visual Meteorological Condition (VMC)) information to data records. These may be obtained, for example, by matching and search of tables of the Federal Aircraft Aviation (FAA) aircraft registration database, including MASTER, ACFTREF, and Aircraft Information tables. The weather condition for every quarter hour may be reported in Aviation System Performance Metrics (ASPM) database in local time. Considering the time column of the data, a new column to records may be added to indicate IMC and VMC weather condition.

B. Extracting Samples

Landings should first be recognized. Then necessary records may be extracted through the following steps.

First, for each mode-s, divide all records of a single aircraft into separate operations (landings, departures, etc). It is assumed that a new operation begins whenever there is a time gap of more than 15 minutes between any two records of that aircraft. Any of these operations may be a landing, departure, fly over, or a ground operation.

Second, check if a given operation is a landing on a given runway, using DTW's runways as examples, by checking if it passes the following tests:

Let $t_{min}$ and $t_{max}$ be the first and last times for which the aircraft is in the "query box."

If $X(t_{min})-X(t_{max})>5,000$ m, then the aircraft proceeds from right to left, and has been long enough in the runway direction to be a candidate for a landing on runways 21L, 21R, 22L, 22R, 27L, or 27R. Similarly, if $X(t_{min})-X(t_{max})<-5,000$ m, then it is a candidate for a landing on runways 03R, 03L, 04R, 04L, 09R, or 09L.

Check if the aircraft ever crosses the threshold of the specific runway and is observed over the runway.

Third, repeat the second step for all operations and aircraft, and record their threshold time and location. Record the time and location of aircraft when it is first observed outside of the runway rectangle after landing, i.e. taxi-in time and location.

If the aircraft track disappears over the runway, then exit from runway is not recorded, record zero or blank for the exit time.

Fourth, sort landings in ascending manner, to recognize lead aircraft and trail aircraft. Record the location of any trail aircraft at the moment its lead aircraft crosses the runway threshold.

Fifth, calculate ROT for any aircraft, and LTI, and IAD for any pair of lead aircraft-trail aircraft.

C. Landing Statistics

In analyzing system operations, it is important to know the peak period for landings. As one embodiment, peak period may be defined for a given runway to be a quarter hour with at least seven landings on that runway. It may also be important to know the proportion of lead aircraft-trail aircraft pairs. The aircraft of each pair may be classified into one of these exemplified classes: small, medium, large, B757, or heavy. Any combination of two of these classes (e.g., small-large; medium-medium; heavy-B757, etc.) may be considered.

Samples of IAD and samples of LTI may be gathered for landings at an airport. Independence of samples may be examined by "one-lag scatter plot". In an embodiment, the plot does not demonstrate a specific pattern of dependency among the samples; one-lag correlation coefficient is 0.25. Higher degrees of lags tend to have lower correlation coefficients. Thus, independence of IAD samples, which is required for distribution fitting purposes, is accepted. In the same manner, independence of LTI samples can be concluded by examining the one-lag scatter plot with a related correlation coefficient of 0.25.

Based on the samples, histograms and probability distribution function (PDF) can be fitted fits for IAD and LTI. For practicality, in fitting a distribution, IAD may be limited to a minimum of 1.5 nmi. Its distribution may be estimated by Erlang where the values represent location (shift), scale, and shape parameters, respectively. In one example, where samples were based on landings at DTW, Erlang was found to be fitted at Erlang(1.5;0.35,6). The mean of the Erlang distribution is [(location par.)+(shape par.)*(scale par.)], and the variance is [(shape par.)*(scale par.)2]. The Maximum Likelihood Estimation (MLE) method may be used for this estimation and for estimations of LTI and ROT probability distributions. The fit may be tested against the Kolmogorov-Smirnov test (KS-test) for significance levels less than 0.10. The Log-Logistic distribution may provide a slightly better fit. In one example, based on the DTW samples, the Log-Logistic distribution was found to be Log-Logistic(1.5;1.9, 4.5), where values represent location, scale, and shape parameters, respectively.

When a minimum of 40 seconds is enforced on the DTW samples, the probability distribution of LTI may be estimated by. Similar to the IAD case, the Log-Logistic(40;61,4.4) distribution may provide a slightly better fit than the Erlang distribution, which is a specific case of the gamma distribution. The Erlang fit is accepted by KS-test for significance levels of 0.05 or smaller.

Samples (e.g., 669 samples at DTW) of ROT in peak IMC periods may be obtained. Those collected at the DTW example may be concluded to be independent because the N-lag correlation coefficient, N=1, 2, ..., is less than or equal to 0.08, and because the one-lag scatter plot does not show any specific pattern of relationship. The distribution of ROT may be estimated using three different distributions—gamma, beta, and normal. Using the MLE method, the best fits for these samples were determined to be Gamma(25;2.8, 8.5) in the enforced range of (25,∞) s, Beta(25,110;6.1,15.4) in the enforced range of (25,110) s, where 3rd and 4th values represent shape parameters, and N(49,8.12) in the open range of (−∞,∞). Gamma is the best fit among these three with the maximum likelihood criterion. However, the beta distribution might be preferred because, as in real situations for ROT, it has lower and upper bounds (for example, it can not be negative). The normal distribution is rejected for ROT samples in the 0.1 significance level. Mean and variance of Beta(L,U;α, β) are:

$$\begin{cases} \mu = L + (U-L) \cdot \dfrac{\alpha}{\alpha+\beta} \\ \sigma^2 = (U-L)^2 \cdot \dfrac{\alpha \cdot \beta}{(\alpha+\beta)^2(\alpha+\beta+1)}. \end{cases} \quad (3)$$

As another embodiment, it would be helpful to know if ROT is different under IMC and VMC weather conditions. Also of interest is the probability (or frequency) that the LTI between two consecutive aircraft is less than the ROT of the leading aircraft. This probability may be represented by $P\{LTI_{k,k+1}<ROT_k\}$, k=1, 2, . . . . It may be named as "runway-related approach risk."

Empirical and a theoretical "point estimation" for $P\{LTI_{k,k+1}<ROT_k\}$, k=1, 2, . . . , in peak periods may be conducted for pairs of aircraft with a certain separation standard (e.g., 3 nmi).

Empirical Method Where a 45 degree line, for example, is plotted on an LTI (x-axis) and ROT (y-axis) grid, and points lie above such line, these points represent events where $LTI_{k,k+1}<ROT_k$. In one study involving data collected (e.g., 4,312 landings) at DTW, the frequency of $LTI_{k,k+1}<ROT_k$, for k=1, . . . , 4312, is 0.0007—that is, 3 out of 4313 landings, assuming that no such event occurred in non-peak periods.

Figure 7:
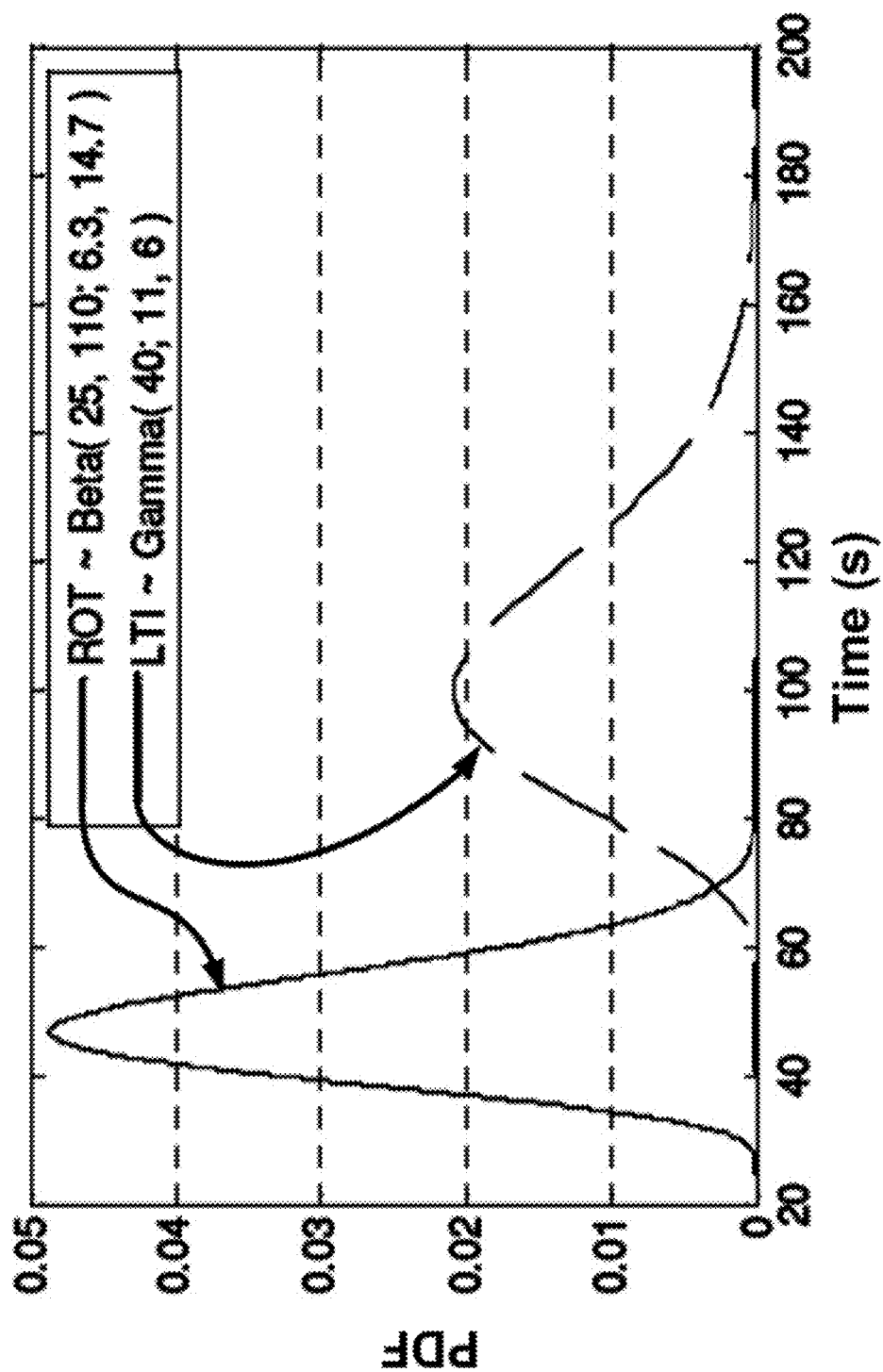
FIG. 7 shows an example of the distributions of ROT and LTI.

Theoretical Method Using the sample data collected (e.g., 4,312 landings) at DTW, the probability distribution fits was calculated as ROT~Beta(6.1,14.5) in the range (25,110), and LTI-Erlang(40;11,6) to estimate P{LTI<ROT}. FIG. 7 shows an overlap of the probability of the distributions of ROT and LTI. Because there is an overlap between LTI and ROT, then P{LTI<ROT} is positive. In fitting the PDF for LTI, samples of LTI that were not considered include those in which the corresponding ROT could not be obtained. Let $g_{ROT}(\bullet)$ represent PDF of ROT, and $F_{LTI}(\bullet)$ represent Cumulative Density Function (CDF) of LTI. Then, $$\begin{aligned} p &= \{LTI < ROT\} \\ &= \int_{-\infty}^{\infty} p\{LTI < ROT \mid ROT = x\} \cdot g_{ROT}(x)\,dx \\ &= \int_{25}^{110} p\{LTI < x\} \cdot g_{ROT}(x)\,dx \\ &= \int_{25}^{110} F_{LTI}(x) \cdot g_{ROT}(x)\,dx. \end{aligned} \quad (4)$$

II. Risk Free Landing (Enforcing a Go-around Procedure)

Generally, it is desired that the chance of an SRO or a WV hazard, whether moderate or severe, be nearly or exactly zero. Conventionally, increasing the target separation between successive aircraft decreases these two risks. The risk can also be reduced by implementing go-around procedures. For example, if two aircrafts will be on the runway at the same time, the trailing aircraft can execute a go-around procedure to avoid a SRO. In reality, the go-around is not always taken.

In these exemplified embodiments, it may be assumed that an aircraft is always enforced to execute a go-around whenever separation minima are not or will not be met. In addition, perfect information may be assumed in making this decision. With these assumptions, the risk of an SRO or a wake-vortex hazard is exactly zero, though there is possibly an increase in the number of go-arounds.

Making the system risk-free by enforced GA creates a different dynamic and may change the optimal level of operations (i.e., the best number of attempts per hour). The optimal level of attempts per hour depends on the GA probability P{GA}. This section calculates this probability for two cases of with and without wake vortex effect.

Figure 6:
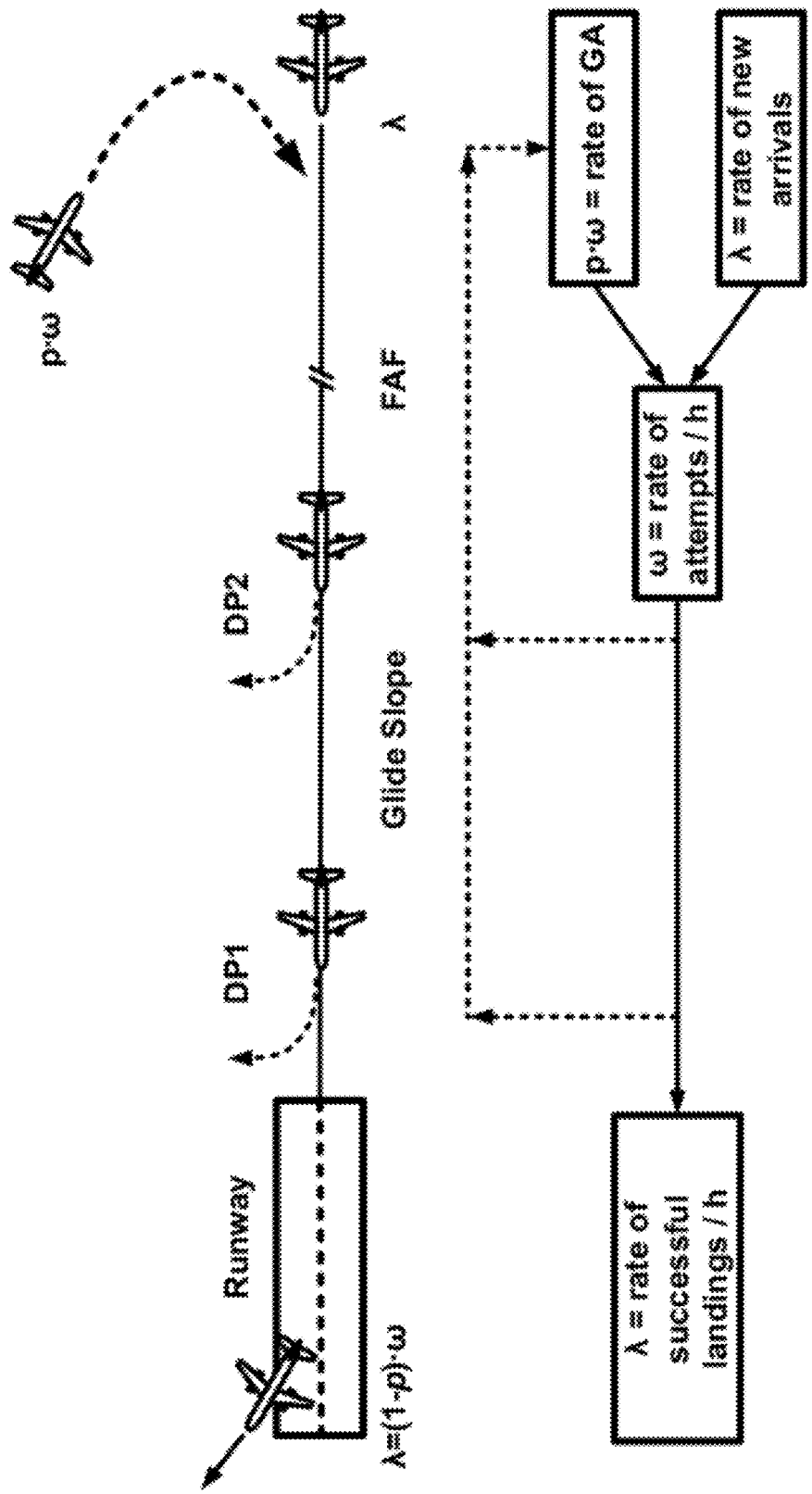
FIG. 6 shows an example of a bird's eye view over the glide slope and go-around procedures on the glide slope and the rates.

In the approach/landing process, two different aircraft flows can be recognized: the flow through the glide slope ω measured in landing attempts per hour, and the flow through the runway (or simply throughput) λ measured in actual landings per hour. FIG. 6 demonstrates this dynamic with enforced GA procedures. When the following aircraft is at decision point 2 (DP2) (e.g., 8 nmi from runway threshold), the controller/pilot decide(s) whether or not to take a GA procedure to avoid the risk of encountering a hazardous wake from the leading aircraft. If the separation is less than a specific value, $x_0$, at this point, then the following aircraft must go-around (GA) to a holding position and return to the glide slope when cleared to attempt again. Such a minimum WV safe separation exists and can be estimated using wake vortex theories, and/or field observations. This operation may be referred to as the "wake vortex GA" or "wake vortex missed approach" procedure in contrast with the well known GA procedure executed to avoid a SRO. The latter may be referred to as a "SRO GA" or "SRO missed approach". For illustrative purposes, DP2 is considered to be 8 nmi from the threshold, and $x_0=65$ s separation as the minimum WV safe separation. If a safe separation is achieved at DP2, then the aircraft can continue the approach. At DP1, which is called the decision height, the follower decides whether or not to execute a go-around to avoid simultaneous runway occupancy with the leading aircraft.

T the total GA probability can be defined as p. It should be noted that p is a function of ω, the number of attempts per hour. The average GA rate (number of go-arounds per hour) is $p(\omega)\cdot\omega$ and the average successful landing rate is $\lambda(\omega)=[1-p(\omega)]\cdot\omega$. The rate of aircraft attempting to land is the arrival rate of aircraft $\lambda(\omega)$ plus the rate of aircraft executing a go-around $p(\omega)\cdot\omega$. As a check for consistency, the attempt rate is $[1-p(\omega)]\cdot\omega+p(\omega)\cdot\omega$ which equals ω.

In addition, the following assumptions may be made:

$LTI_{k+1,k}$ and $ROT_k$ are independent random variables

The separation is minimized at DP2 and remains unchanged afterwards until the touchdown. In other words, the separation at DP2 equals LTI Shifting LTI to the right or left does not change the shape of its probability distribution Zero risk assumed for execution of both GA procedures GA are absolutely respected and enforced at both decision points The number of GA in an hour is not restricted Wake vortex GA and SRO GA conditions never simultaneously occur for a pair. That is, no simultaneous go-around for aircrafts k and k+1 happens for all k=1, 2, . . . .

where $LTI_{k,k+1}$ is the landing time interval between aircraft k and k+1 measured at the runway threshold (in seconds), and $ROT_k$ is the runway occupancy time of aircraft k (measured in seconds).

A. Go-Around Probability Assuming No Wake Vortex Effect

In this section, the possible go-around at DP2 is ignored. In other words, the only thing considered is the risk of a SRO. The risk of a hazardous wake vortex encounter is not considered. The probability of a SRO is $$P\{SRO\} = P\{LTI < ROT \text{ \& Follow aircraft lands}\}$$
$$= P\{\text{Follow aircraft lands} | LTI < ROT\} *$$
$$P\{LTI < ROT\}.$$

This probability can be reduced to zero by enforcing the go-around procedure. In this case, $$P\{\text{Follow aircraft lands}|LTI<ROT\}=0, \text{ and}$$
$$p_1(\omega)=P\{GA\}=P\{LTI<ROT\}. \quad (5)$$

Probability distribution functions of peak period LTI and ROT are estimated for DTW for the pairs of FAA 3 nmi minimum separation pairs. These follow-lead aircraft pairs include S-S, L-S, B757-S, H-S, L-L, B757-L, and H-L. The estimations are used here for methodology illustrations. LTI is the peak period distribution calculated for arrival of aircraft to the glide slope (or the final approach fix) with the rate ω.

FIG. 7 illustrates the LTI and ROT probability distributions obtained for 3 nmi pairs. p(ω) is estimated as 0.004, the mean of LTI is 106 s, and the average number of attempts per hour (during peak periods) is ω=3600/106=34 attempts/h. In this period, no go-around was observed, so ω=λ, but P{SRO}=0.004 instead of 0.0.

Changes in arrival rates (that is, changes in λ or ω) can be modeled by shifting the LTI distribution to the left or right (i.e., by changing the location parameter). Shifting the LTI distribution also changes the probability that LTI<ROT, or equivalently, the probability of a go-around. p(ω)=P{LTI<ROT} as indicated by the broken line in FIG. 8. Shifting LTI toward left or right (i.e., changing the location parameter) provides different values for ω and p(ω) assuming other parameters of the distribution remain unchanged by shifting. p(ω)=P{LTI<ROT} is given by broken line in FIG. 8.

B. Total go-Around Probability with Wake Vortex Effect

When the wake vortex effect is taken into account and WV GA procedure is in place, an aircraft would possibly miss the approach for two reasons at two different points: WV safe threshold and runway safe threshold (decision height). For this situation, let $x_0$ to be the minimum wake vortex safe separation of successive aircraft given in seconds, and L to be the lower limit of LTI distribution; e.g., L=40 s. To calculate P(GA) two cases for L and $x_0$ can be considered.

Case 1: L<x0. For this case, $$P(GA) = \int_{x_0}^{\infty} F_{LTI}(y) d F_{ROT}(y) + F_{LTI}(x_0) F_{ROT}(x_0), \quad (6)$$

where $F_{LTI}$ and $F_{ROT}$ are CDF of LTI and ROT, respectively.

Detailed calculations may be given as follows: For the case L<$x_0$, note that P(GA)=P{separation at DP2<$x_0$ or, exclusively, separation at DP1<ROT}=P{LTI<$x_0$ or LTI<ROT}. Then, $$P(GA)=P\{LTI<x_0\}+P\{LTI<ROT \text{ and } LTI \geq x_0\}. \quad (I.1)$$

On the other hand, $$P\{LTI < ROT \text{ and } LTI \geq x_0\} = \int_{x_0}^{\infty} \int_{x_0}^{y} dF_{LTI,ROT}(x, y) \quad (I.2)$$

$$= \int_{x_0}^{\infty} \left[ \int_{x_0}^{y} dF_{LTI}(x) \right] dF_{ROT}(y)$$

$$= \int_{x_0}^{\infty} [F_{LTI}(y) - F_{ROT}(x_0)] dF_{ROT}(y)$$

$$= \int_{x_0}^{\infty} F_{LTI}(y) dF_{ROT}(y) - F_{LTI}(x_0) \cdot \int_{x_0}^{\infty} dF_{ROT}(y)$$

$$= \int_{x_0}^{\infty} F_{LTI}(y) dF_{ROT}(y) - F_{LTI}(x_0) \cdot (1 - F_{ROT}(x_0))$$

$$= \int_{x_0}^{\infty} F_{LTI}(y) dF_{ROT}(y) - F_{LTI}(x_0) + F_{LTI}(x_0) F_{ROT}(x_0),$$

where $F_{LTI}$ and $F_{ROT}$ are CDF of LTI and ROT, respectively. Joint distribution of LTI and ROT is broken into multiplication of their marginal distributions because of their independence. Plugging in (I.2) in (I.1) gives equation (6).

Case 2: $L \geq x_0$. This case means that LTI shifted to the right as much that its lower point L is above the wake vortex safety threshold of $x_0$. No wake vortex GA would ever occur in this case, and $P\{GA\}$ is obtained from equation (5).

Figure 8:
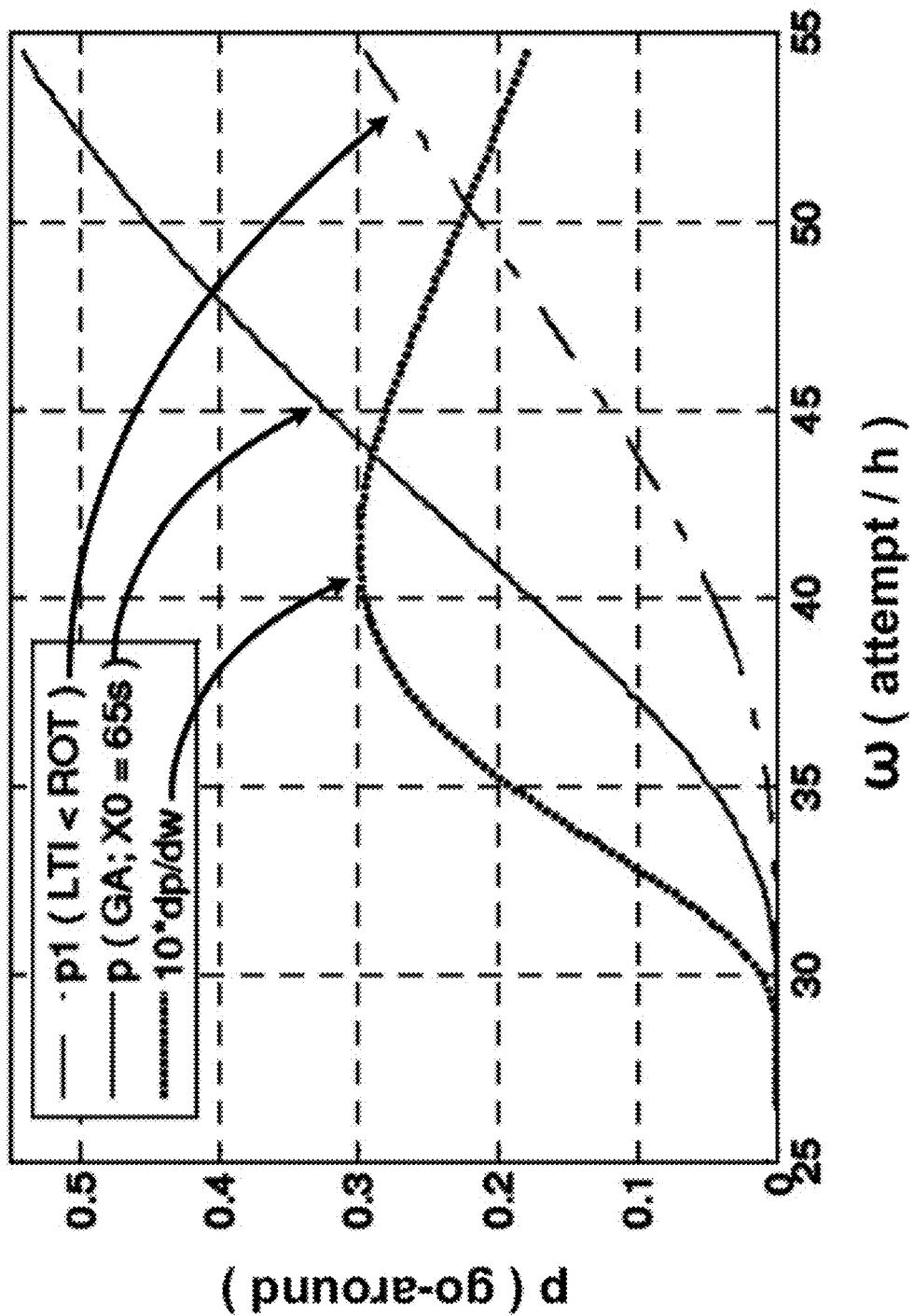
FIG. 8 shows an example of total P(GA), P(LTI<ROT), and $dp/d\omega$ for WV safe threshold of 65 s.

Total $p(\omega) = P\{GA\}$ is shown in FIG. 8 for peak period DTW IMC distributions, which are given in FIG. 7, and for $x_0 = 65$ s. This figure also shows $p_1$ and derivative of $p(\omega)$ in terms of $\omega$. The derivative $dp/d\omega$, which will be used in the following sections, is multiplied by 10 to make it more visible in this figure.

III. Maximizing Runway Throughput

The present invention looks to find the relation between glide-slope rate of $\omega$ attempts/h, runway throughput $\lambda(\omega)$, and go around probability $p(\omega)$. Then one can find out for what values of $\omega$ and p throughput $\lambda$ is maximum, while $P\{SRO\}=0$ is maintained by enforced GA procedure. In other words, the objective is maximization of the runway throughput. That is, $$\text{Maximize } \lambda(\omega) = [1 - p(\omega)] \cdot \omega. \quad (7)$$

This model is the same for both with and without WV effect assumptions. However, $p(\omega)$ differs depending on each of these cases, as discussed below.

A. Maximum Throughput without Wake Vortex Effect

Figure 9:
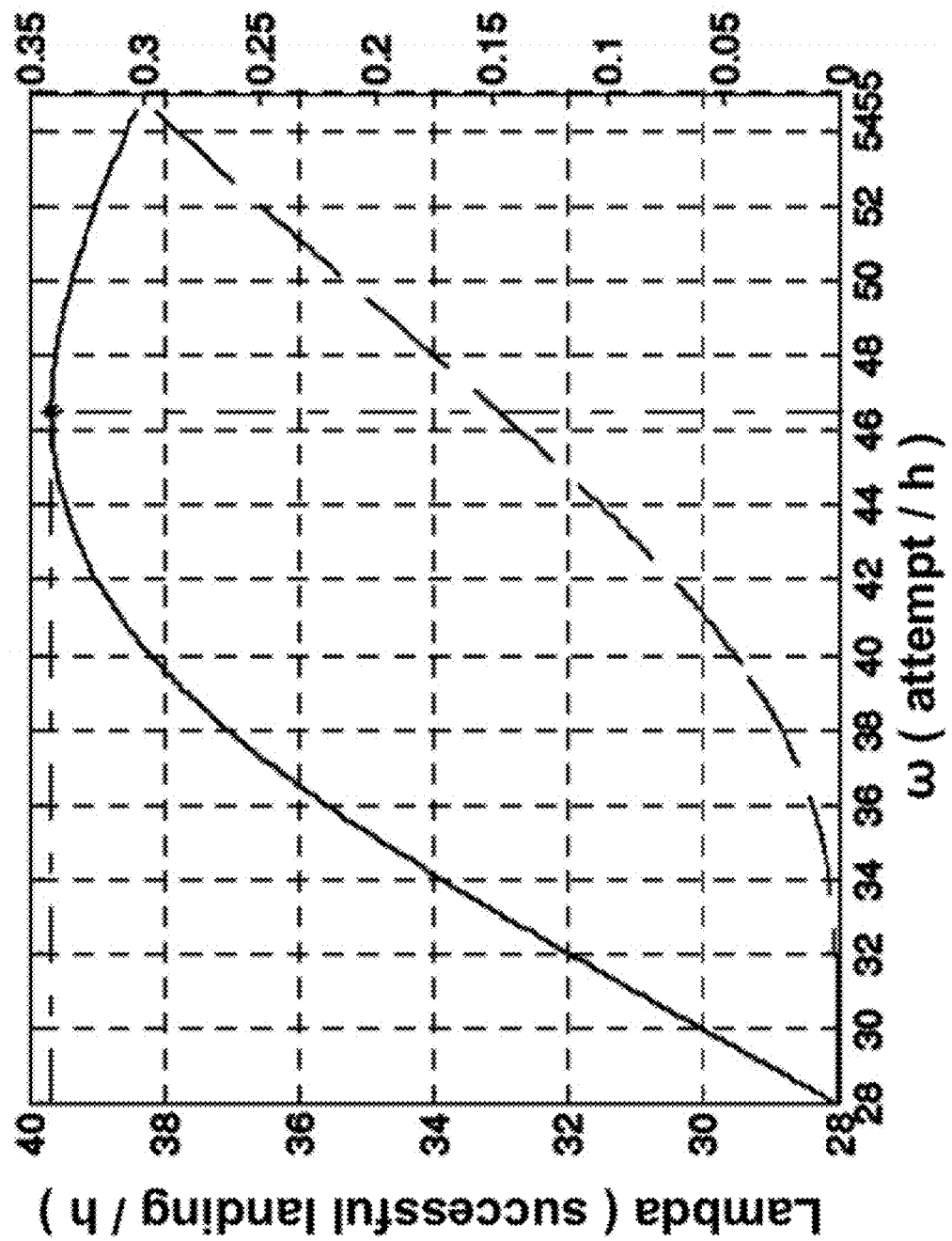
FIG. 9 shows landing/h (left) and P{GA} (right) vs. attempts/h ($\omega$).

In this case $p(\omega)$ is calculated from equation (5) and plugged into the problem (4) to maximize the throughput. FIG. 9 provides $\lambda(\omega)$ in the left axis for the distributions in hand. $\lambda(\omega)$ is calculated for all pairs of $(\omega, p(\omega))$ in the right axis. By increasing the rate of attempts $\omega$, the percentage of GA increases but the percentage of successful landings decreases. After a point, the decrease in the rate of successful landings dominates the increase in the rate of attempts. In other words, throughput $\lambda(\omega)$ has a unique maximum or optimal point. This scenario can also be explained in mathematical terms. $p(\omega)>0$ is increasing, and $1-p(\omega)$ is decreasing in $\omega$. So after a point, decrease of $1-p(\omega)$ dominates increase of $\omega$ and $[1-p(\omega)] \cdot \omega$ would have a maximum.

For distributions in hand, the optimal $(\omega, \lambda, p)$ is (46.5, 39.6, 0.148), as indicated in FIG. 9. To have a stable system, the arrival rate to the TRACON, $\lambda$, is adjusted so that $\omega$ is maintained in the optimal level of 46.5 attempts/h. 39.6 landings/h is the maximum and optimal throughput.

B. Maximum Throughput with Wake Vortex Effect

The previous section analyzed the optimal level of landing attempts when the wake vortex constraint was relaxed and SRO was the only risk factor. In this section, wake vortex risk is also considered in maximization of runway throughput. Using $P\{GA\}=p(\omega)$ from equations (6) and (5) in problem (3), the following solution may be obtained.

Figure 10:
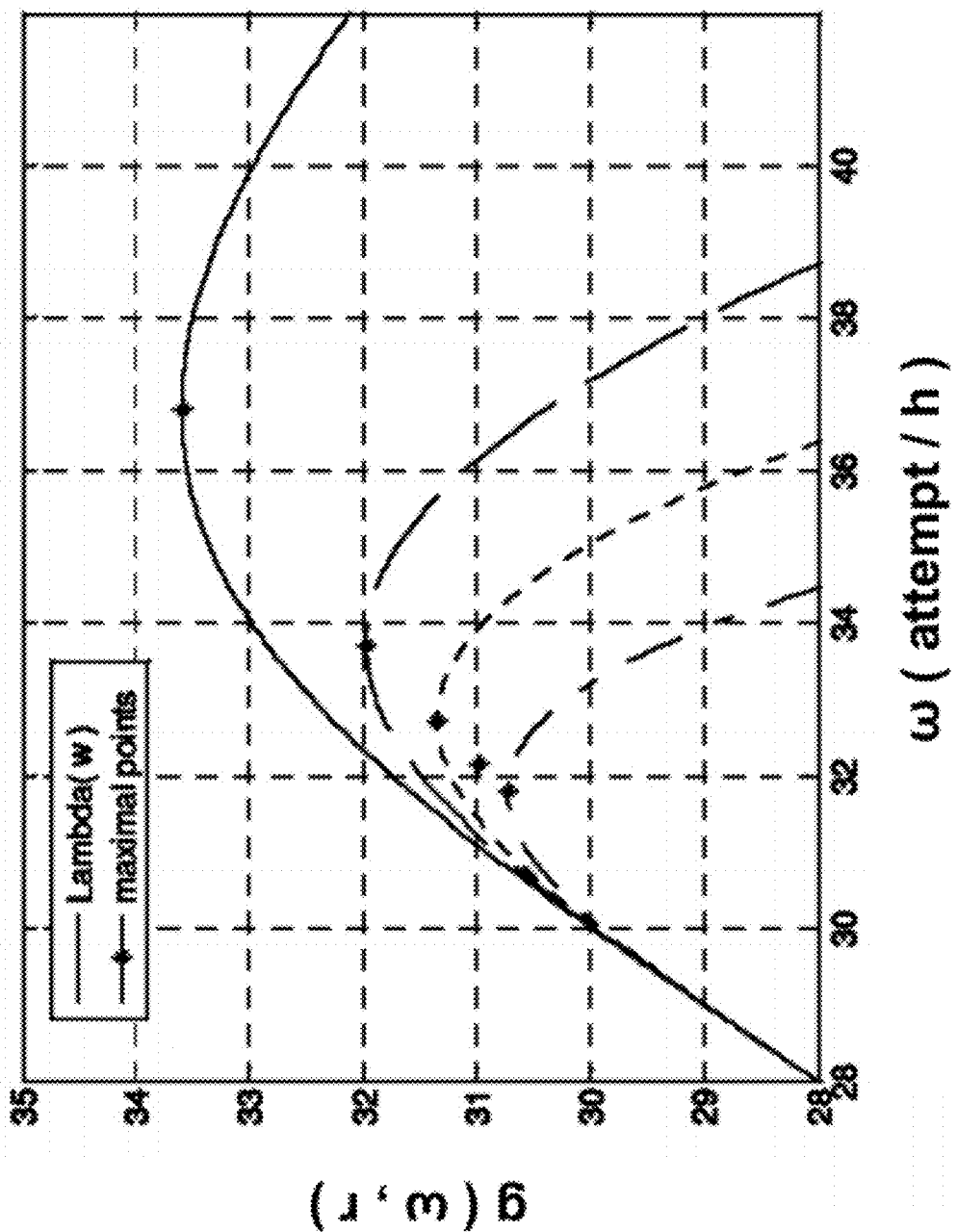
FIG. 10 shows $\lambda(\omega)$ and $g(\omega;r)$ for r=1, 2, and 4 from top to bottom, respectively.

Throughput $\lambda(\omega)$ in terms of $\omega$ attempts/h is shown in FIG. 10 with the solid line (indicated by r=0). Other plots of this figure are the subject of next section. The optimal $(\omega, \lambda, p)$ is about (37.0, 33.5, 0.08) and $\omega \cdot p(\omega)$ is 3 go-around per h.

WV is costing the system 39.6−33.5=6 landings per peak hour. Thus WV is costing the system about 21,900 landings per year if there is 10 hours of peak period every day. This scenario is for the cases of 3 nmi pairs, in which the majority of them are large aircrafts. Now this value can be multiplied by R to obtain dollar value WV cost estimation. For R=$1000, it is about $22 m per year for a single landing runway under IMC.

IV. Maximizing Net Economic Gain

Maximizing the number of (successful) landings does not necessarily guarantee the overall economic optimality of the landing operations. The reason is because costs and gains from the operations are important optimality parameters and will be taken into account. For the landing operations when absolute safety is guaranteed by enforced GA procedure, the economic profit/benefit to the regional/whole economy (including airlines, airport, employees, etc) is the result of a successful landing. The overall cost to the regional/whole economy associates with the go-around procedure. The costs of successful landings are embedded in the landing profits, that is, total revenue to all stakeholders minus operational cost, except the cost of GA execution. The net economic gain or surplus, that is, total gain minus total cost of an hour of peak period operations, is desired to be maximized with respect to the number of attempts/h rate, $\omega$. Since this net economic gain is a random variable, we consider maximizing its expected value, ES=E{economic surplus}.

The gain from one successful landing is R which occurs with probability $1-p(\omega)$ for every landing attempt. The loss of one landing attempt is the cost of go-around C which occurs with probability $p(\omega)$. Thus, since the number of attempts per hour is $\omega$, then the expected value of the net gain from hourly landing attempts is $ES(\omega;R,C)$ given in (4) and the optimization objective is $$\text{Maximize } ES(\omega;R,C) = \omega \cdot [(1-p(\omega)) \cdot R - p(\omega) \cdot C] \quad (8)$$

Some dollar values for R and C can be considered to illustrate economic behavior of the system. For any given type of aircraft, C is the summation of cost components such as passenger delay cost, disturbed schedules cost of downstream flights, take off cost, aircraft operations cost, and airport cost. Any of these cost components depend on parameters such as aircraft load factors and the arrival rate at a given time, which are uncertain. Thus, C is a random variable. However, its expected value is considered as a suitable estimation of this parameter. Estimation of R and C is part of on ongoing research. However, at the time being and for the sake of illustration, it is considered that C=$4,000 for a large aircraft in a peak hour. Three scenarios of $1,000, $2,000, and $4,000 are considered for R here.

A. Economic Optimality without Wake Vortex Effect

Figure 11:
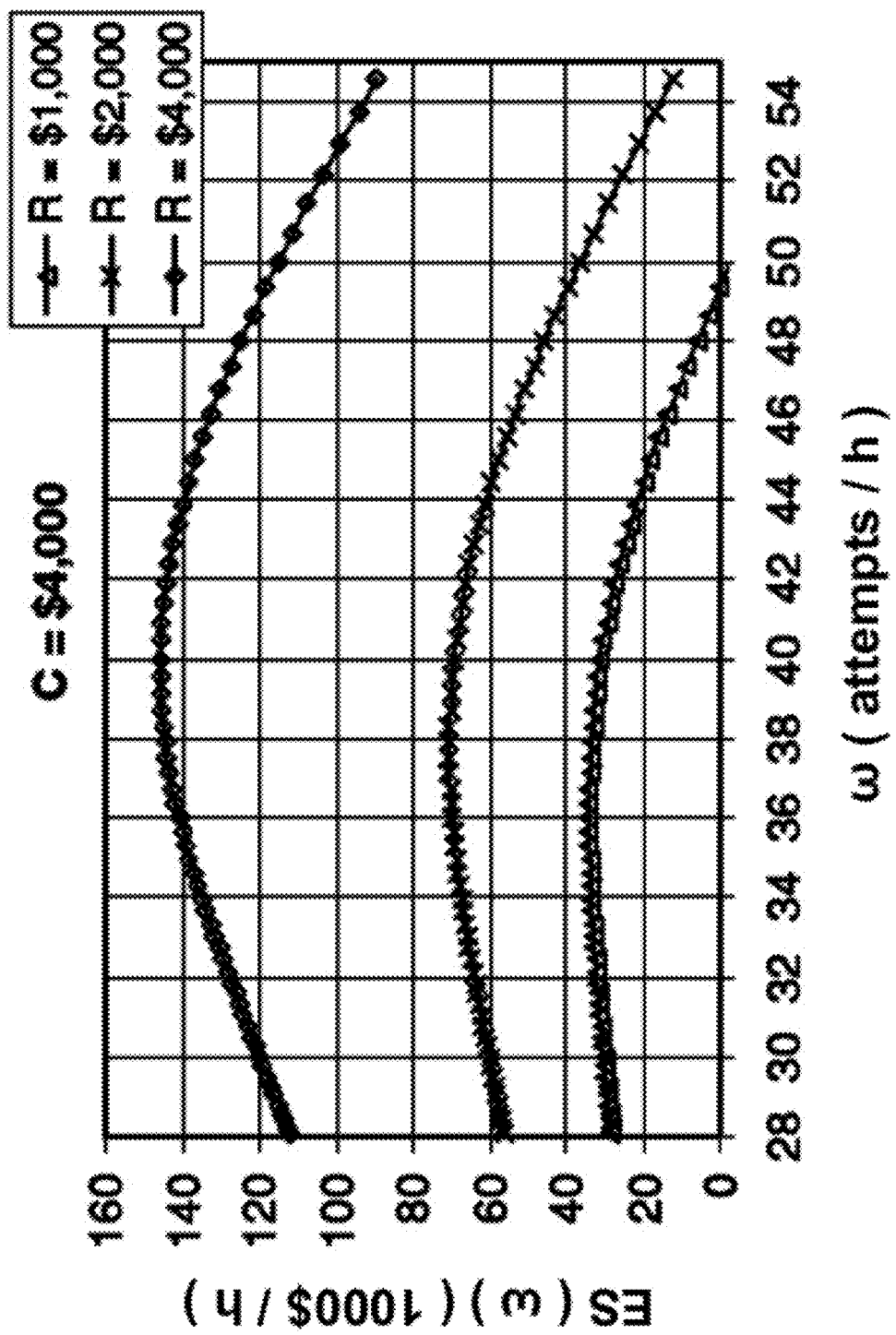
FIG. 11 shows ES($\omega$;R,C) of one hour peak period landing operations.

For this case $p(\omega)$ is calculated from equation (5), and fed into problem (4). FIG. 11 is a plot of $ES(\omega;R,C)$ in thousands of dollars, for assumed values of R and a fixed C=$4,000.

To obtain a more general form, ES can be written in terms of the ratio C/R. Factoring out R in equation (6) gives $$ES(\omega; R, C) = R \cdot \omega \cdot \left[(1 - p(\omega)) - p(\omega) \cdot \frac{C}{R}\right]$$
$$= R \cdot \omega \cdot \left[1 - \left(1 + \frac{C}{R}\right)p(\omega)\right].$$

Thus, $ES(\omega;R,C)$ is a multiplication of constant dollar value R and a function of $\omega$. Define the latter function to be $g(\cdot)$ as follows:

$$g(\omega;r) = \omega \cdot [1 - (1+r)p(\omega)]$$

or $$g(\omega;r) = \lambda(\omega) - r \cdot \omega \cdot p(\omega),$$

where $r = C/R$. Thus, maximizing $g(\omega;r)$ is equivalent to maximizing $ES(\omega;R,C)$. So the problem reduces to the more general form of $$\text{Maximize } g(\omega; r) = \omega \cdot [1 - (1+r)p(\omega)] \quad (9)$$
$$= \lambda(\omega) - r \cdot \omega \cdot p(\omega).$$

Figure 12:
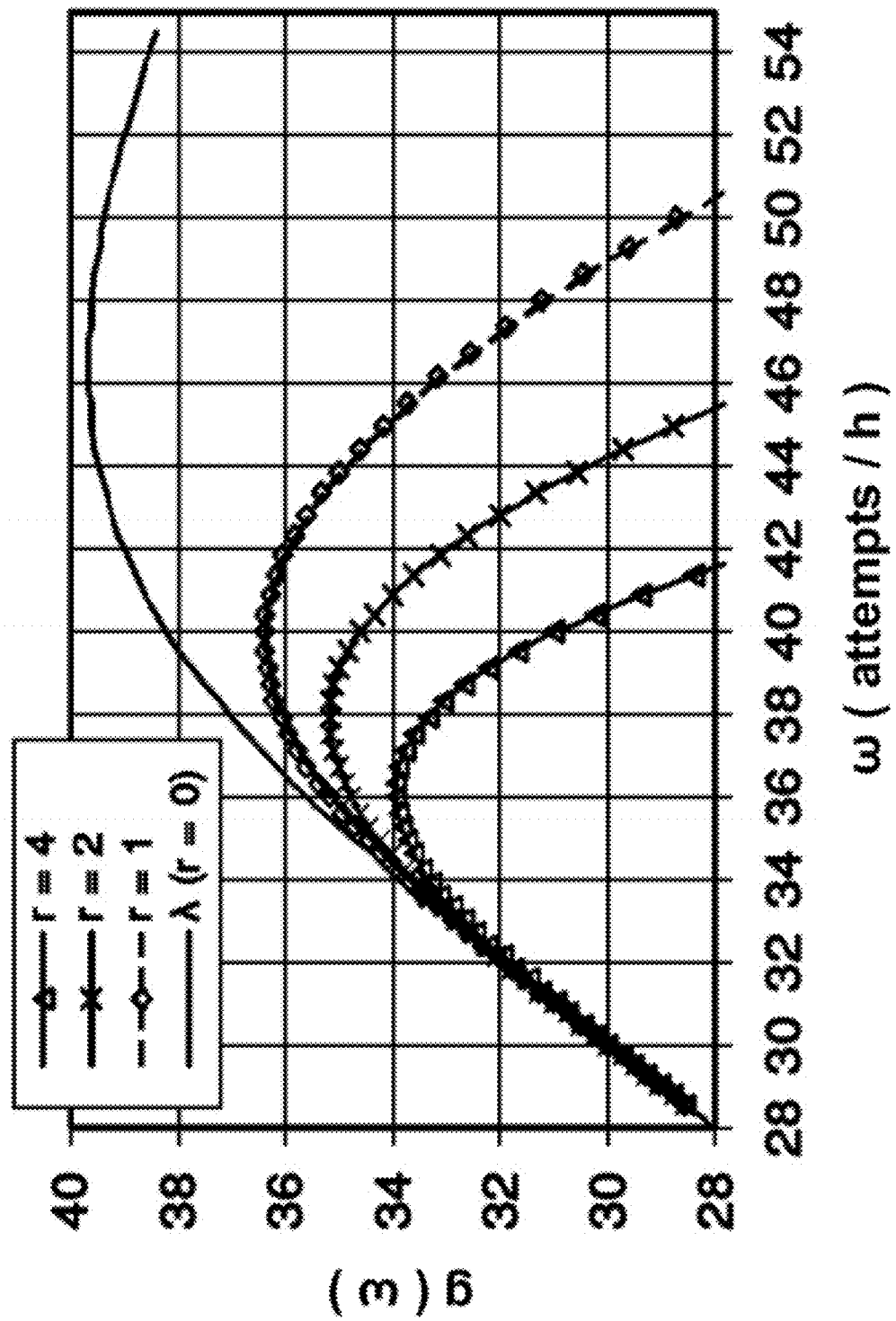
FIG. 12 shows $g(\omega;r)$ for different values of cost to benefit ratio, where optimal throughput increases as r decreases.

FIG. 12 illustrates $g(\omega;r)$ for $r=0, 1, 2, 4$ and $\omega$ in [28,55].

Note that the optimal solution $\omega^*(r) = \text{Argmax}\{g(\omega;r)\}$ depends on the ratio $r=C/R$. The derivative of $g(\omega;r)$ with respect to $\omega$ is zero at $\omega^*$. $ES(\omega;R,C)$ and $g(\omega;r)$ have the following interesting properties (at least for the LTI and ROT distributions in hand):

Property 1: For given R and C, $ES(\omega;R,C)$ and $g(\omega;r)$ are unimodal in a practical peak period rates of attempts/h. That is, they have a unique maximum in this range. This is the necessary optimality condition. This fact can be justified by visual investigations of FIGS. 9 and 10 for given DTW peak period landing distributions. However, this fact remains to be proven mathematically. In FIG. 9, $ES(\omega;R,C)$ has a unique maximum for any given R and C. In FIG. 10, $g(\omega;r)$ has a unique maximum for any given r.

Property 2: $g(\omega;r)$ decreases as r increases for any fixed $\omega$. This is seen from equation (9). The only term that includes r is the term inside the brackets which is decreasing in r.

Property 3: $g(\omega;r) \to \lambda(\omega) = (1-p(\omega)) \cdot \omega$ when $r \to 0^+$, which is obvious from equation (9). So, $g(\omega;r)$ is bounded by $\lambda(\omega) = [1-p(\omega)] \cdot \omega$ and is below it, see FIG. 12.

Property 4: $\omega^*(r) = \text{Argmax}\{g(\omega;r)\}$ is decreasing in r for $28 < \omega < \text{Argmax}\{dp/d\omega\}$.

The proof for Property 4 is by contradiction. $\omega^*(r)$ is the point where $dg/d\omega = 0$ or $p(\overline{\omega}^*) + \overline{\omega}^* \cdot p'(\overline{\omega}^*) = 1/(1+r)$. Increasing r decreases the right hand side and consequently the left hand side of this equation. On the other hand, $\omega$, $p(\omega)$, and $dp/d\omega$ are all increasing in $\omega$ for $\omega < \text{Argmax}\{dp/d\omega\}$. Thus if $\omega$ does not decrease, the LHS will not decrease. This showing is a contradiction, and completes the proof.

These properties are seen in FIGS. 11 and 12. They are unimodal (property 1). $\omega^*$ decreases as r increases (property 2). Argmax$\{dp/d\omega\}$ is calculated 49.7 attempts/h for the LTI and ROT in hand. $g(\omega;r)$ is below $\lambda(\omega)$. Peak of $g(\omega;r)$ moves down and left by increasing the relative penalty of go-around to the landing benefit. Properties of $g(\omega;r)$ imply that the highest value for the optimal number of attempts per hour and the upper bound of the optimal throughput is the maximal point of $\lambda(\omega)$. This scenario is achieved when C is much smaller than R.

In such a case, the problem reduces to maximizing $\lambda(\omega) = [1-p(\omega)] \cdot \omega$ scenario, as discussed above. The highest throughput value is a good estimation of the average runway landing capacity. In the example provided, this capacity is 39.6 landings/h for the case that wake vortex effect is ignored, and GA procedure is enforced.

As examples, for $r=1$, $(\omega, \lambda, p)^* = (40.0, 38.2, 0.045)$. For $r=2$, $(\omega, \lambda, p)^* = (38, 37.1, 0.024)$. The latter means that to maximize the expected value of the net economic gain (surplus) from the landing operations, when go-around cost C is 2 times larger than landing profit R, the average glide slope throughput shall be adjusted at 38.2 attempts/h which gives 37.0 successful landings/h. Note that in this case, system throughput is 3 landings/h more than the current level of 34 landing/h with associated $P\{SRO\} = 0.004$, as indicated in FIG. 9.

B. Economic Optimality with Wake Vortex Effect

In this case the problem is maximizing (6), or equivalently (4), where $P\{GA\} = p(\omega)$ is calculated from equations (6) and (5). Note that $\omega = 3600/\text{mean}(\text{LTI})$ where LTI is in seconds. All properties of $g(\omega;r)$ in the section above are still valid for this new $p(\omega)$. Justification procedures are the same that are provided above. For DTW peak period IMC distributions of 3 nmi pairs derivative of $p(\omega)$ is maximized at 41.3 attempts/h when wake vortex safe threshold is 65 s or 2.2 nmi, as seen in FIG. 8. This is the condition for property 4.

Figure 13:
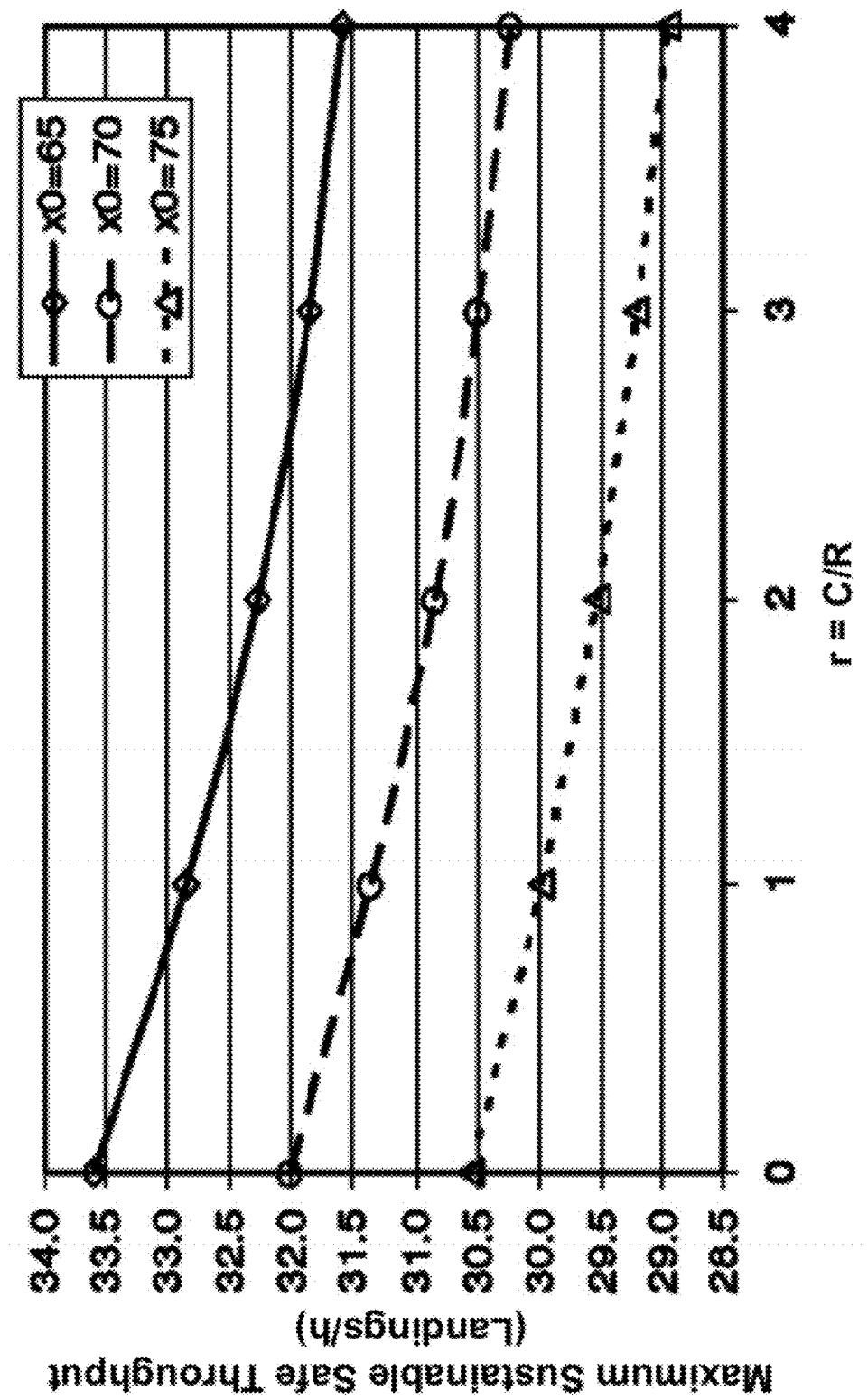
FIG. 13 shows optimal throughput in r for safe WV thresholds of 65, 70, and 75 s.

The optimal results for DTW distributions are provided in TABLE 1 and FIG. 10 for $x_0 = 65, 70$, and 75 seconds. FIG. 13 is visualization of TABLE 1. The optimal solution $(\omega, \lambda, p)^*$ is $(36.8, 33.6, 0.087)$ for $(x_0, r) = (65, 0)$. Since $r=0$, that is, cost of go around is negligible in comparison with the landing profit, then this is the optimal number of landings/h. So the average landing capacity of the system is 33.6 landings/h independent of the market condition. $(\omega, \lambda, p)^*$ is $(32.7, 32.3, 0.014)$ for $(x_0, r) = (65, 2)$, meaning that the optimal throughput is 32.3 landings/h if $C=2R$ in the market, that is, the cost of go-around is two times bigger than the profit gained from a successful landing. Note that in TABLE 1, optimal throughput decreases as safe WV threshold increases. However, eventually the safe threshold is a certain number and once it is recognized other cases become irrelevant.

Some capacity estimations would be helpful. In present literature, the reciprocal of the minimum safe separation is sometimes considered as an estimation of the capacity. Using that known method for the safe minimum separation of 65 s, one obtains the capacity of 55.4 landings per hour. One can intuitively recognizes that this number is too high since in practice the capacity is generally between 30 and 40 landings/h. The problem with this method is that it ignores the probabilistic nature of the process. Achieving this level of throughput requires that the mean of LTI to be adjusted at 65 s which implies $P\{LTI < ROT\} = 0.30$ from FIG. 9. In other words, with the enforced go-around procedure, there will be more than 30% loss of attempted landings at DP1. Such case would lead to the throughput level of less than 32 landing/h as can be seen in FIG. 10. Further, in such an operation the system should tolerate the high cost of 13 go-around/h. So this known reciprocal method is not suitable.

TABLE 1

Optimal Values for Different safe WV threshold and r

| WV threshold | r | ω* | λ* | P* |
|---|---|---|---|---|
| $x_0 = 65$ s | 0 | 36.8 | 33.6 | 0.087 |
|  | 1 | 33.7 | 32.8 | 0.026 |
|  | 2 | 32.7 | 32.3 | 0.014 |
|  | 3 | 32.1 | 31.9 | 0.009 |
|  | 4 | 31.8 | 31.6 | 0.007 |
| $x_0 = 70$ s | 0 | 34.7 | 32.0 | 0.079 |
|  | 1 | 32.1 | 31.4 | 0.024 |
|  | 2 | 31.3 | 30.8 | 0.013 |
|  | 3 | 30.8 | 30.5 | 0.009 |
|  | 4 | 30.4 | 30.2 | 0.006 |
| $x_0 = 75$ s | 0 | 33.0 | 30.5 | 0.073 |
|  | 1 | 30.7 | 30.0 | 0.022 |
|  | 2 | 29.9 | 29.5 | 0.012 |
|  | 3 | 29.5 | 29.2 | 0.008 |
|  | 4 | 29.1 | 29.0 | 0.006 |

The present invention's methodology, which considers the probabilistic behavior of the system, estimated the average capacity of 33.6 landings per hour for 65 s safe WV threshold and risk free landings. Economic considerations may reduce the optimal throughput to about 32 landings/h with maximized net economic gain, 1% go-around, and risk free (safe) operations.

Additionally, the process may determine a throughput that maximizes an economic throughput, based on the cost-benefit ratio of landings to go-around maneuvers. The benefit of a successful landing may include the net benefit to one or more of the airlines, passengers, airports, employees, etc. In a further embodiment, the net benefit of a successful landing is the total revenue to all beneficiaries minus operational costs, except the costs of a go-around maneuver. The cost of go-around maneuvers may include the cost to one or more of the airlines, passengers, airports, employees, etc. in lost time, fuel, goodwill, salaries, increased wait time for other aircraft in the holding pattern, etc. In one embodiment, the cost of a go-around maneuver and the benefit of a successful landing are used to help determine economically the most beneficial number of attempted landing and projected successful landings versus go-around maneuvers. In a further embodiment, the economically most beneficial number of attempted landing sets a lower limit on the separation distance between aircraft to avoid the risk of SRO and/or WV.

Many of the elements described in the disclosed embodiments may be implemented as modules. A module (sometimes referred to as element, component, or mechanism) is defined here as an isolatable element that performs a defined function and has a defined interface to other elements. The modules described in this disclosure may be implemented in hardware, software, firmware, wetware (i.e., hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL), such as VHSIC hardware description language (VHDL) or Verilog, that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, the above explanation has focused on the example of a single WV decision point and a single SRO decision point. However, one skilled in the art will recognize that additional embodiments could include more than one WV decision point and/or SRO decision point, or a continuum of such points on the glide slope.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What are claimed are:

1. A method for landing aircraft on a runway using an aircraft landing accident avoidance device, comprising:
  a. determining at least two probability distribution functions, where one of the probability distribution functions is runway occupancy time, and where another is:
    1. landing time interval;
    2. inter-arrival distance; or
    3. a combination thereof;
  b. determining a safe lower limit on a separation between a lead aircraft and a trail aircraft on a glide slope to the runway;
  c. determining a maximum sustainable safe attempt-to-land rate on the runway based on the safe lower limit and the probability distribution functions;
  d. directing the trail aircraft to enter the glide slope with a target separation from the lead aircraft corresponding to the maximum sustainable safe attempt-to-land rate;
  e. while the trail aircraft is in the glide slope, determining an actual separation between the lead aircraft and the trail aircraft; and f. directing the trail aircraft to execute a go-around maneuver if the actual separation approaches the safe lower limit.

2. The method according to claim 1, wherein the go-around maneuver begins at a wake vortex decision point.

3. The method according to claim 1, wherein determining a maximum sustainable safe attempt-to-land rate includes determining:
   a. a maximum sustainable safe throughput;
   b. a maximum sustainable safe net economic output; or
   c. a combination of the above.

4. The method according to claim 3, wherein the maximum sustainable safe throughput is determined using a probability of executing the go-around maneuver and the maximum sustainable safe attempt-to-land rate.

5. The method according to claim 3, wherein the maximum sustainable net economic output is determined using a ratio premised on the cost of go-around maneuvers to the benefit of landings.

6. The method according to claim 1, wherein the safe lower limit depends on atmospheric conditions.

7. The method according to claim 1, wherein the safe lower limit depends on the physical characteristics of the lead aircraft and the physical characteristics of the trail aircraft.

8. The method according to claim 1, wherein the timing of when to direct the trail aircraft to execute a go-around maneuver considers the reaction time of the trail aircraft.

9. An aircraft landing accident avoidance device comprising:
   a. a probability distribution function module configured for determining at least two probability distribution functions, where one of the probability distribution functions is runway occupancy time, and where another is:
      1. landing time interval;
      2. inter-arrival distance; or
      3. a combination thereof;
   b. a safe lower limit module configured for determining a safe lower limit on a separation between a lead aircraft and a trail aircraft on a glide slope to a runway;
   c. a maximum sustainable safe attempt-to-land rate module configured for determining a maximum sustainable safe attempt-to-land rate on the runway based on the safe lower limit and the probability distribution functions;
   d. a glide slope decision module configured for directing the trail aircraft to enter the glide slope with a target separation from the lead aircraft corresponding to the maximum sustainable safe attempt-to-land rate;
   e. an actual separation module configured for determining an actual separation between the lead aircraft and the trail aircraft while the trail aircraft is in the glide slope; and
   f. a warning module configured for directing the trail aircraft to execute a go-around maneuver if the actual separation approaches the safe lower limit.

10. The device according to claim 9, wherein the go-around maneuver begins at a wake vortex decision point.

11. The device according to claim 9, wherein the maximum sustainable safe attempt-to-land rate module includes:
   d. a maximum sustainable safe throughput module;
   e. a maximum sustainable net economic output module; or
   f. a combination of the above.

12. The device according to claim 11, wherein the maximum sustainable safe throughput module is configured for using a probability of executing the go-around maneuver and the maximum sustainable safe attempt-to-land rate.

13. The device according to claim 11, wherein the maximum sustainable net economic output module is configured for using a ratio premised on the cost of go-around maneuvers to the benefit of landings.

14. The device according to claim 9, wherein the safe lower limit depends on atmospheric conditions.

15. The device according to claim 9, wherein the safe lower limit depends on the physical characteristics of the lead aircraft and the physical characteristics of the trail aircraft.

16. The device according to claim 9, wherein the warning module considers the reaction time of the trail aircraft as to when to direct the trail aircraft to execute a go-around maneuver.

17. A computer readable storage medium including instructions for performing a method, when executed by a processor, for landing aircraft on a runway using an accident avoidance processor, the method comprising:
   a. determining at least two probability distribution functions, where one of the probability distribution functions is runway occupancy time, and where another is:
      1. landing time interval;
      2. inter-arrival distance; or
      3. a combination thereof;
   b. determining a safe lower limit on a separation between a lead aircraft and a trail aircraft on a glide slope to the runway;
   c. determining a maximum sustainable safe attempt-to-land rate on the runway based on the safe lower limit and the probability distribution functions;
   d. directing the trail aircraft to enter the glide slope with a target separation from the lead aircraft corresponding to the maximum sustainable safe attempt-to-land rate;
   e. while the trail aircraft is in the glide slope, determining an actual separation between the lead aircraft and the trail aircraft; and
   f. directing the trail aircraft to execute a go-around maneuver if the actual separation approaches the safe lower limit.

18. The computer readable storage medium according to claim 17, wherein the go-around maneuver begins at a wake vortex decision point.

19. The computer readable storage medium according to claim 17, wherein determining a maximum sustainable safe attempt-to-land rate includes determining:
   a. a maximum sustainable safe throughput using a probability of executing the go-around maneuver and the maximum sustainable safe attempt-to-land rate;
   b. a maximum sustainable net economic output using a ratio premised on the cost of go-around maneuvers to the benefit of landings; or
   c. a combination of the above.

20. The computer readable storage medium according to claim 17, wherein the safe lower limit depends on:
   a. atmospheric conditions;
   b. the physical characteristics of the lead aircraft; and
   c. the physical characteristics of the trail aircraft.

* * * * *